(12) United States Patent
Tsai et al.

(10) Patent No.: US 8,417,359 B2
(45) Date of Patent: Apr. 9, 2013

(54) POWER TRANSMISSION METHOD OF HIGH-POWER WIRELESS INDUCTION POWER SUPPLY SYSTEM

(75) Inventors: Ming-Chiu Tsai, Taipei County (TW); Chi-Che Chan, Taipei County (TW)

(73) Assignee: Fu Da Tong Technology Co., Ltd., Chung-Ho, Taipei County (TW)

( * ) Notice: Subject to any disclaimer, the term of this patent is extended or adjusted under 35 U.S.C. 154(b) by 387 days.

(21) Appl. No.: 12/898,992

(22) Filed: Oct. 6, 2010

(65) Prior Publication Data

US 2011/0291489 A1    Dec. 1, 2011

(30) Foreign Application Priority Data

May 31, 2010   (TW) ............................... 99117430 A

(51) Int. Cl.
  *G05B 11/01*   (2006.01)
  *G05B 11/28*   (2006.01)
  *H01F 27/42*   (2006.01)
(52) U.S. Cl. ........... 700/22; 700/286; 700/297; 307/104
(58) Field of Classification Search ............... 700/22, 700/286, 297; 307/104
  See application file for complete search history.

(56) References Cited

U.S. PATENT DOCUMENTS

| | | | | |
|---|---|---|---|---|
| 8,035,255 | B2* | 10/2011 | Kurs et al. | 307/104 |
| 8,217,621 | B2* | 7/2012 | Tsai et al. | 320/108 |
| 8,258,652 | B2* | 9/2012 | Sekino et al. | 307/104 |
| 2009/0058361 | A1* | 3/2009 | John | 320/128 |
| 2010/0109445 | A1* | 5/2010 | Kurs et al. | 307/104 |
| 2010/0133917 | A1* | 6/2010 | Sekino et al. | 307/104 |
| 2011/0169337 | A1* | 7/2011 | Kozakai | 307/104 |
| 2011/0199046 | A1* | 8/2011 | Tsai et al. | 320/108 |
| 2011/0215757 | A1* | 9/2011 | Tsai | 320/108 |
| 2011/0231029 | A1* | 9/2011 | Ichikawa et al. | 700/298 |
| 2011/0235800 | A1* | 9/2011 | Furukawa et al. | 380/33 |
| 2011/0264945 | A1* | 10/2011 | Tsai et al. | 713/340 |
| 2011/0278949 | A1* | 11/2011 | Tsai et al. | 307/104 |
| 2011/0298419 | A1* | 12/2011 | Tsai et al. | 320/108 |
| 2011/0299636 | A1* | 12/2011 | Tsai et al. | 375/340 |
| 2012/0007443 | A1* | 1/2012 | Tsai et al. | 307/104 |
| 2012/0074899 | A1* | 3/2012 | Tsai et al. | 320/108 |
| 2012/0091794 | A1* | 4/2012 | Campanella et al. | 307/11 |

(Continued)

OTHER PUBLICATIONS

Dissanayake, T.; Budgett, D.; Hu, A.P.; Malpas, S.; and Bennet, L., "Transcutaneous Energy Transfer System for Powering Implantable Biomedical Devices", 2009, Proceedings of the 2008 ICBME.*

(Continued)

*Primary Examiner* — Mohammad Ali
*Assistant Examiner* — Kelvin Booker
(74) *Attorney, Agent, or Firm* — Muncy, Geissler, Olds & Lowe, PLLC

(57) ABSTRACT

A power transmission method used in a high-power wireless induction power supply system consisting of a power-supplying module and a power-receiving module is disclosed. The power-supplying module regulates its output energy by means of frequency modulation and driving power adjustment, enabling the energy to be received by the power-receiving module and transmitted through a power-receiving coil array and a primary resonant capacitor and a secondary resonant capacitor of power-receiving resonance circuit, a synchronizing rectifier, a low-power voltage stabilizer, a high-frequency filter capacitor, a first power switch, a low-frequency filter capacitor and a second power switch of a filter circuit for output to an external apparatus.

8 Claims, 16 Drawing Sheets

U.S. PATENT DOCUMENTS

| | | | |
|---|---|---|---|
| 2012/0091820 A1* | 4/2012 | Campanella et al. | 307/104 |
| 2012/0091949 A1* | 4/2012 | Campanella et al. | 320/108 |
| 2012/0119914 A1* | 5/2012 | Uchida | 340/584 |
| 2012/0153732 A1* | 6/2012 | Kurs et al. | 307/104 |
| 2012/0153733 A1* | 6/2012 | Schatz et al. | 307/104 |
| 2012/0153737 A1* | 6/2012 | Karalis et al. | 307/104 |
| 2012/0153738 A1* | 6/2012 | Karalis et al. | 307/104 |
| 2012/0193998 A1* | 8/2012 | Tsai et al. | 307/104 |
| 2012/0235501 A1* | 9/2012 | Kesler et al. | 307/104 |
| 2012/0235502 A1* | 9/2012 | Kesler et al. | 307/104 |
| 2012/0235503 A1* | 9/2012 | Kesler et al. | 307/104 |
| 2012/0235504 A1* | 9/2012 | Kesler et al. | 307/104 |
| 2012/0235566 A1* | 9/2012 | Karalis et al. | 315/70 |
| 2012/0235567 A1* | 9/2012 | Karalis et al. | 315/70 |
| 2012/0235633 A1* | 9/2012 | Kesler et al. | 320/108 |
| 2012/0235634 A1* | 9/2012 | Hall et al. | 320/108 |
| 2012/0239117 A1* | 9/2012 | Kesler et al. | 607/61 |
| 2012/0242159 A1* | 9/2012 | Lou et al. | 307/104 |
| 2012/0242225 A1* | 9/2012 | Karalis et al. | 315/70 |
| 2012/0248886 A1* | 10/2012 | Kesler et al. | 307/104 |
| 2012/0248887 A1* | 10/2012 | Kesler et al. | 307/104 |
| 2012/0272076 A1* | 10/2012 | Tsai et al. | 713/300 |
| 2012/0286724 A1* | 11/2012 | Tsai et al. | 320/108 |

OTHER PUBLICATIONS

Hsu, J.-R. W.; Hu, A.P.; and Swain, A., Advances in Solid State Circuits Technologies, Chapter 11: "Directional Tuning Control of Wireless/Contactless Power Pickup for Inductive Power Transfer (IPT) System", Apr. 2010, ISBN 978-953-307-086-5.*

Schutz, J.; Scheible, G.; and Willmes, C., "Load Adaptive Medium Frequency Resonant Power Supply", 2002, IEEE 2002 28th Annual Conference of the Industrial Electronics Society, vol. 1, pp. 282-287.*

Si P.; Hu, A.P.; Malpas, S.; and Budgett, D., "A Frequency Control Method for Regulating Wireless Power to Implantable Devices", Mar. 2008, IEEE Transactions on Biomedical Circuits and Systems, vol. 2, No. 1.*

Wambsganss, P.; and Huwig, D., "Inductive Power Transmission System with Stabilized Output Voltage", 2010, RRC Power Solution GmbH, Corporate Research, Homburg, Germany, retrieved from the Internet on Nov. 20, 2012 at "www.rrc-wireless-power.com".*

Waters, A.T., "Wireless Charging Systems Using Inductive Coupling", May 2010, Thesis Project for Oregon State University, Electrical and Computer Engineering Department.*

* cited by examiner

POWER TRANSMISSION METHOD OF HIGH-POWER WIRELESS INDUCTION POWER SUPPLY SYSTEM

This application claims the priority benefit of Taiwan patent application number 099117430, filed on May 31, 2010.

BACKGROUND OF THE INVENTION

1. Field of the Invention

The present invention relates to power supply systems and more particularly, to a power transmission method of high-power wireless induction power supply system, which employs frequency modulation technique and multi-array architecture to regulate the Output power subject to the condition of the load, ensuring high level of safety and efficiency in wireless power transmission.

2. Description of the Related Art

Following fast development of electronic and internet technology, many digitalized electronic products, such as digital camera, cellular telephone, multimedia player (MP3, MP4) and etc., have been continuously developed and have appeared on the market. These modern digital electronic products commonly have light, thin, short and small characteristics.

However, for high mobility, power supply is an important factor. A mobile digital electronic product generally uses a rechargeable battery to provide the necessary working voltage. When power low, the rechargeable battery can be recharged. For charging the rechargeable battery of a digital electronic product, a battery charger shall be used. However, it is not economic to purchase a respective battery charger when buying a new mobile electronic product. Further, when one uses a big amount of money to purchase different mobile electronic products, a special storage space is necessary for the storage of the mobile electronic products. Further, it is inconvenient to carry and store many different mobile electronic products and the related battery chargers.

In view of the aforesaid problems, wireless induction power supply systems are created. However, most commercial wireless induction power supply systems are for low power application, for example, for use in a mobile telephone or digital camera. There are certain high-power wireless induction power supply systems for use in high-power electronic apparatus, such as notebook computer. However, these high-power wireless induction power supply systems have drawbacks as follows:

1. During operation, the circuit board and its electronic components generate much waste heat, and the power-transmitting coils will also product heat, increasing safety risk.

2. The circuit architecture includes power switch means and resonance capacitor means that operate at a high frequency. Due to technical limitations, conventional techniques cannot fabricate a high-power power switch that operates at a high frequency for high power output. Even if a high-power power switch that operates at a high frequency for high power output is available, the manufacturing cost will be extremely high. The fabrication of resonance capacitor encounters the same problem.

3. The wireless power-transmitting and power-receiving induction coils of a high-power wireless induction power supply system must be accurately aligned. Further, the output electrical energy is fixed and not adjustable subject to the condition of the load. Therefore, conventional high-power wireless induction power supply systems have a low performance.

4. Conventional high-power wireless induction power supply systems are commonly designed to let the induction coil of the power-receiving end receive a voltage higher than the demand of the target at first and then to let the voltage be lowered to the level of the demand of the target by a DC-DC Step-Down IC. However, because voltage-down is achieved through switch means, energy loss will occur and interference noise and waste heat will be produced during each switching operation.

Therefore, it is desirable to a power transmission method for high-power wireless induction power supply system that eliminates the aforesaid problems.

SUMMARY OF THE INVENTION

The present invention has been accomplished under the circumstances in view. It is one object of the present invention to provide a power transmission method for a high-power wireless induction power supply system consisting of a power-supplying module and a power-receiving module, which enables the microprocessor of the power-supplying module to achieve high-safety and high-efficiency wireless transmission of power subject to running of a software program, to regulate the output power subject to the condition of the load, to monitor the voltage and temperature at multiple points and to interrupt the system and provide audio and video warning signals in case of system abnormality.

It is another object of the present invention to provide a power transmission method for a high-power wireless induction power supply system consisting of a power-supplying module and a power-receiving module, which enables the power-supplying module to disperse the electric current passing therethrough subject to the use of multiple MOSFET arrays that are connected in parallel and operate at a high frequency, enhancing power transmission efficiency under a high power and high current operation, wherein the MOSFET arrays that are connected in parallel are independently operable so that the number of the operating MOSFET arrays can be reduced or increased subject to the demand of the load, minimizing power loss due to unnecessary switching operation and allowing carrying of sufficient current to drive a resonance circuit under a high power output.

It is still another object of the present invention to provide a power transmission method for a high-power wireless induction power supply system consisting of a power-supplying module and a power-receiving module, which utilizes a low-impedance resonant loop consisting of a parallelly connected capacitor array and power-supplying coil array for the resonance circuit of the power-supplying module to prohibit an abnormal temperature rise and to enhance power transmission efficiency during a high power output and passing of a large current. By using the known standard products of the capacitor array and the power-supplying coil array, the manufacturing cost of the high-power wireless induction power supply system is greatly reduced.

It is still another object of the present invention to provide a power transmission method for a high-power wireless induction power supply system consisting of a power-supplying module and a power-receiving module, which enables the microprocessor of the power-supply module to output a PWM (Pulse Width Modulation) signal to a first driver circuit/second driver circuit and to check the power output of the resonance circuit by means of a software, thereby adjusting the power output accurately and rapidly subject to the system demand. Further, the voltage of the power-supplying module is accurately controlled subject to regulation of the power output of the power-supplying module. Further, the filter circuit of the power-receiving module provides a two-step power filtration function. Subject to the operation of the software, the power-supplying module accurately and rapidly regulates its power output when the power-receiving module increases its power demand. The power-receiving module eliminates the use of any DC-DC Step-Down device, and therefore waste heat is minimized and conversion efficiency is enhanced.

It is still another object of the present invention to provide a power transmission method for a high-power wireless induction power supply system consisting of a power-supplying module and a power-receiving module, in which the power-receiving module comprises a power-receiving resonance circuit consisting of a power-receiving coil array and a primary resonant capacitor and secondary resonant capacitor electrically connected in parallel to the power-receiving coil array, a synchronizing rectifier electrically connected to the primary resonant capacitor, a low-power voltage stabilizer electrically connected to the secondary resonant capacitor and adapted for providing a low voltage to the power-supplying module and the synchronizing rectifier.

It is still another object of the present invention to provide a power transmission method for a high-power wireless induction power supply system consisting of a power-supplying module and a power-receiving module, in which the microprocessor of the power-receiving module is capable of analyzing system voltage and current and providing a power demand signal to the power-supplying module during wireless power transmission operation so that the power-supplying module can regulate its power output accurately subject to the power demand of the power-receiving module and control the voltage within the target value. This power transmission method enables the output voltage of the power-receiving module to be well controlled without the use of any DC-DC step-down device, reducing power loss during voltage conversion and improving system operation efficiency.

It is still another object of the present invention to provide a power transmission method for a high-power wireless induction power supply system consisting of a power-supplying module and a power-receiving module, in which the filter circuit of the power-receiving module comprises a high-frequency filter capacitor, a first power switch, a low-frequency filter capacitor and a second power switch. The high-frequency filter capacitor and the low-frequency filter capacitor can output power supply through the first power switch and the second power switch respectively. The high-frequency filter capacitor can be a ceramic filter capacitor that has the advantages of high voltage resistance and high performance in high frequency filtration and the drawback of low capacity. Therefore, the ceramic filter capacitor is used at the first stage and electrically connected to the low-frequency filter capacitor through the first power switch that can be a MOSGET. The low-frequency filter capacitor can be selected from a regular electrolytic capacitor that has the characteristic of high capacity and the drawbacks of low voltage resistance and low high-frequency performance. By means of using the high-frequency filter capacitor and the low-frequency filter capacitor to match with the first power switch and the second power switch, a high-performance filter circuit is provided.

DETAILED DESCRIPTION OF THE PREFERRED EMBODIMENT

Figure 1:
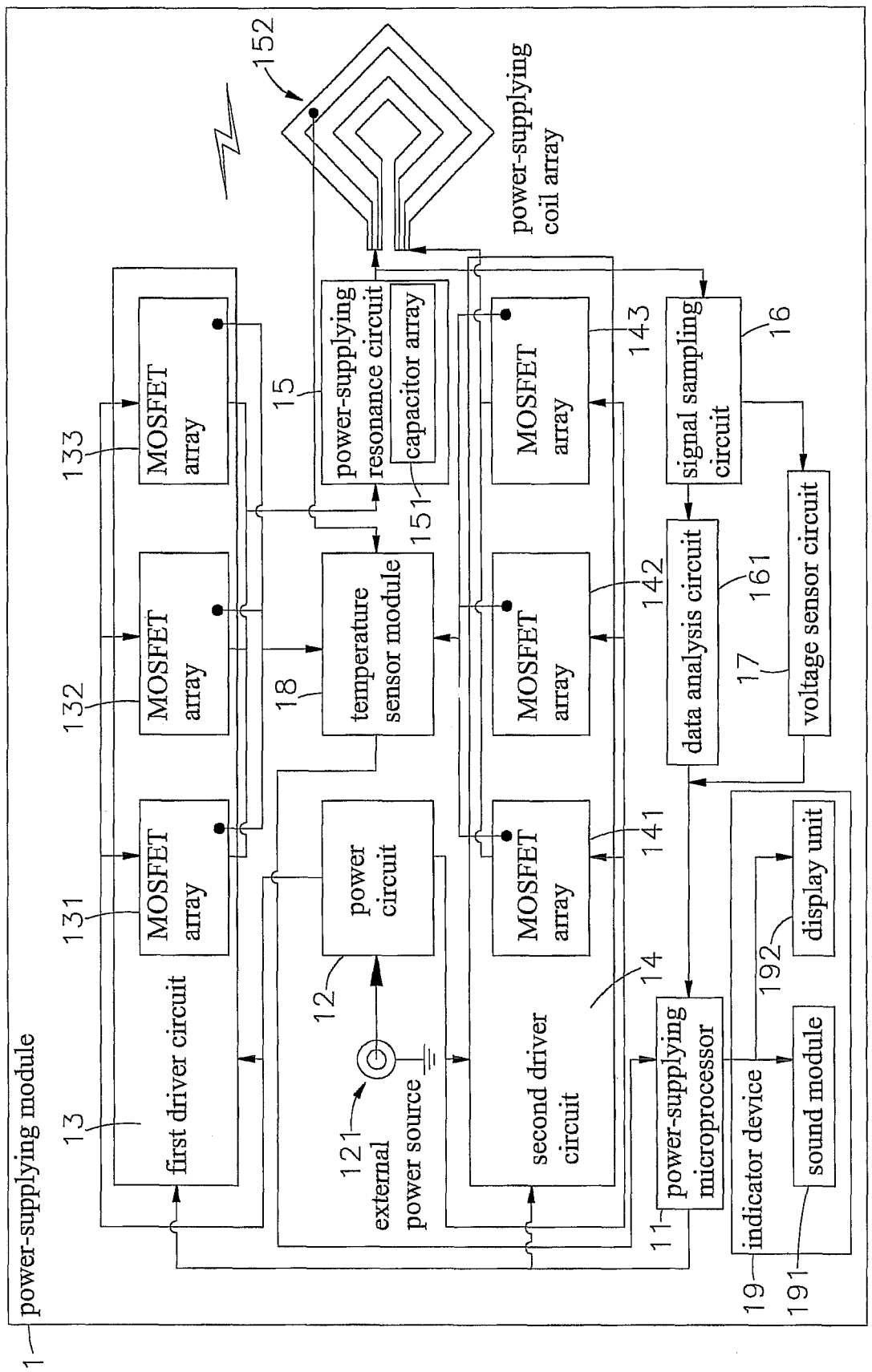
FIG. 1 is a circuit block diagram of a power-supplying module for high-power wireless induction power supply system in accordance with the present invention.
Figure 2:
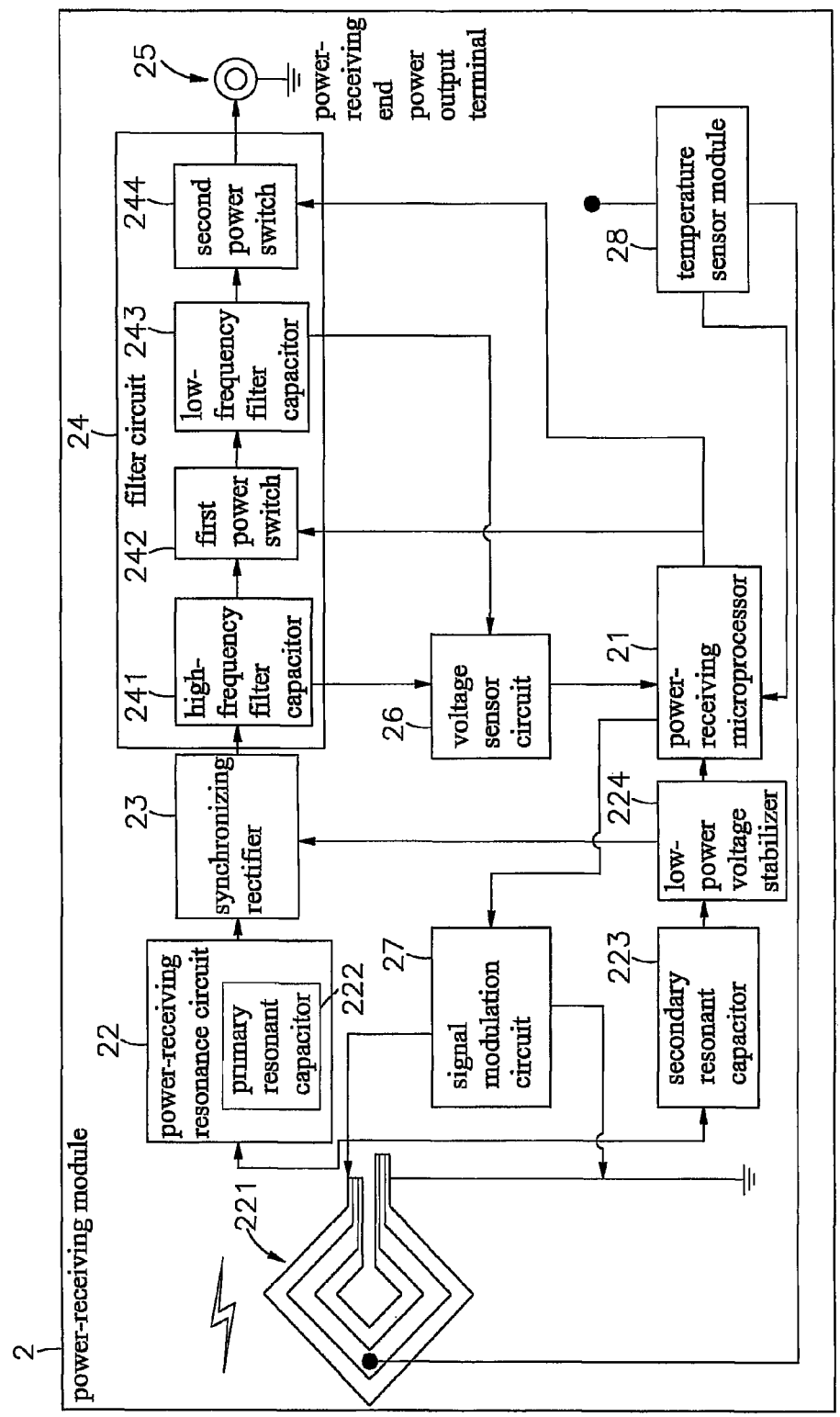
FIG. 2 is a circuit block diagram of a power-receiving module for high-power wireless induction power supply system in accordance with the present invention.
Figure 3A:
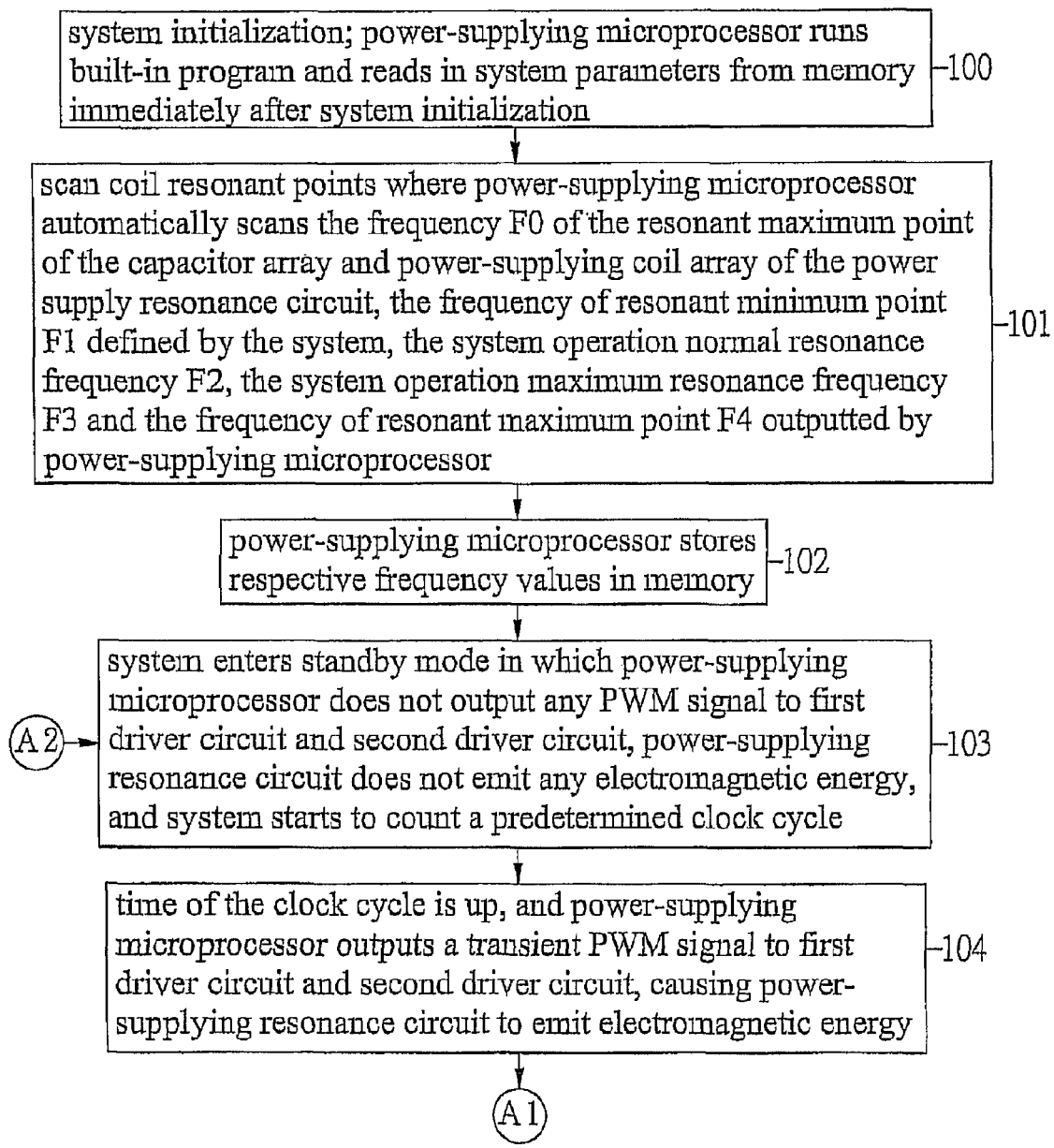
FIG. 3A is an operation flow chart of the power transmission method of the power-supplying module of the high-power wireless induction power supply system in accordance with the present invention.
Figure 3B:
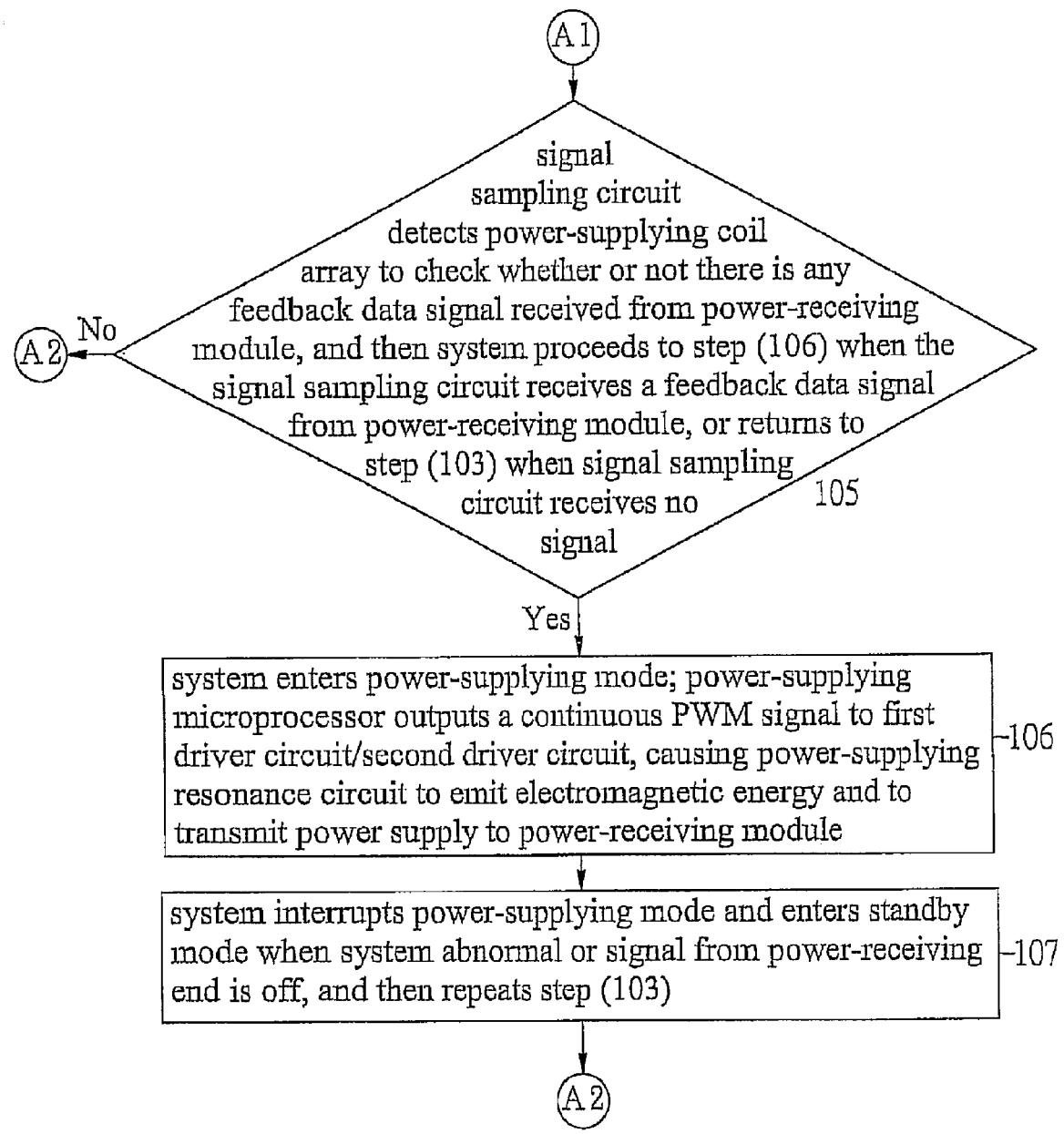
FIG. 3B is an operation flow chart of the power transmission method of the power-supplying module of the high-power wireless induction power supply system in accordance with the present invention.
Figure 4:
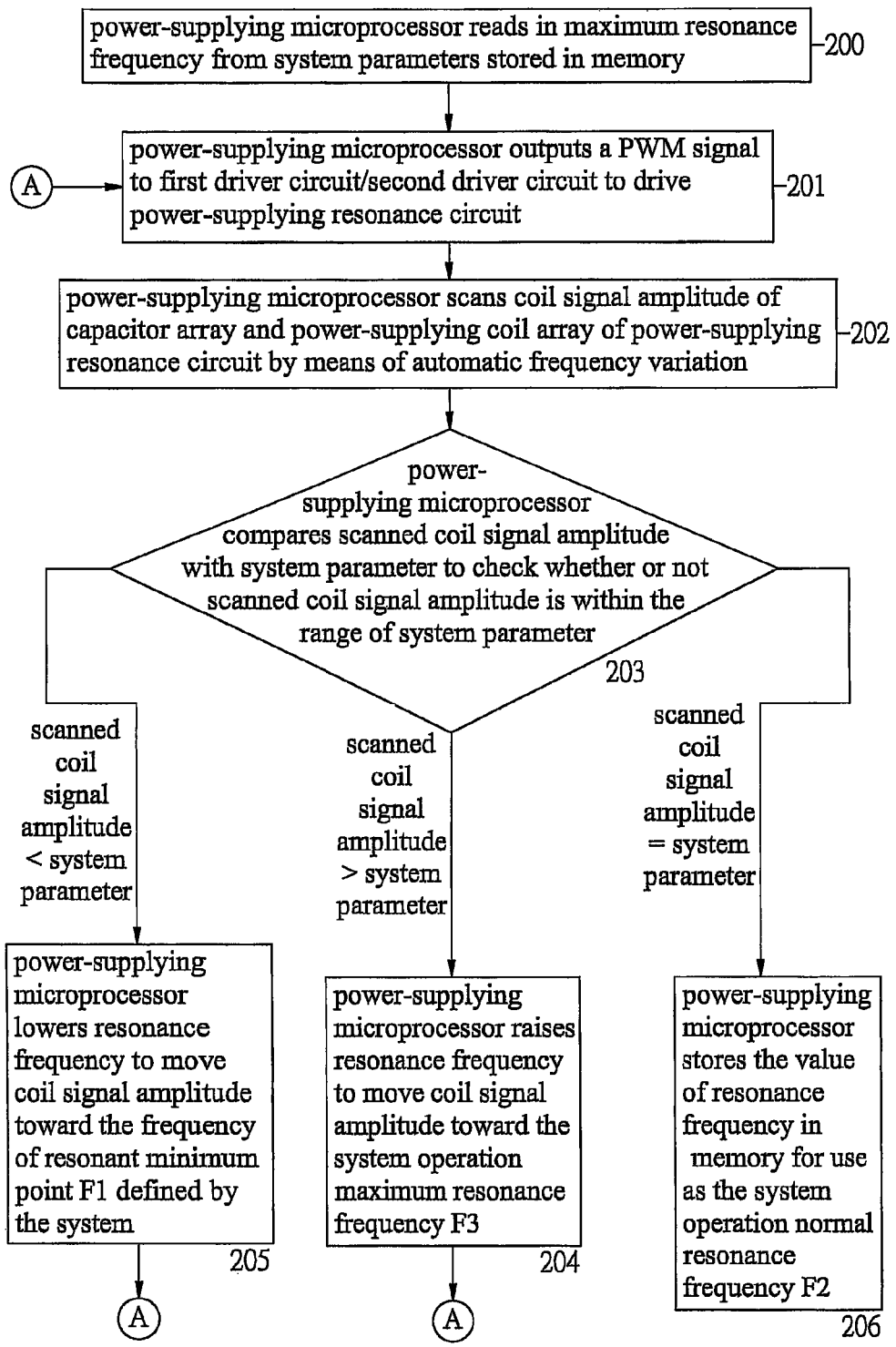
FIG. 4 is an operation flow chart of the coil resonant point scanning operation of the power-supplying module of the high-power wireless induction power supply system in accordance with the present invention.
Figure 5:
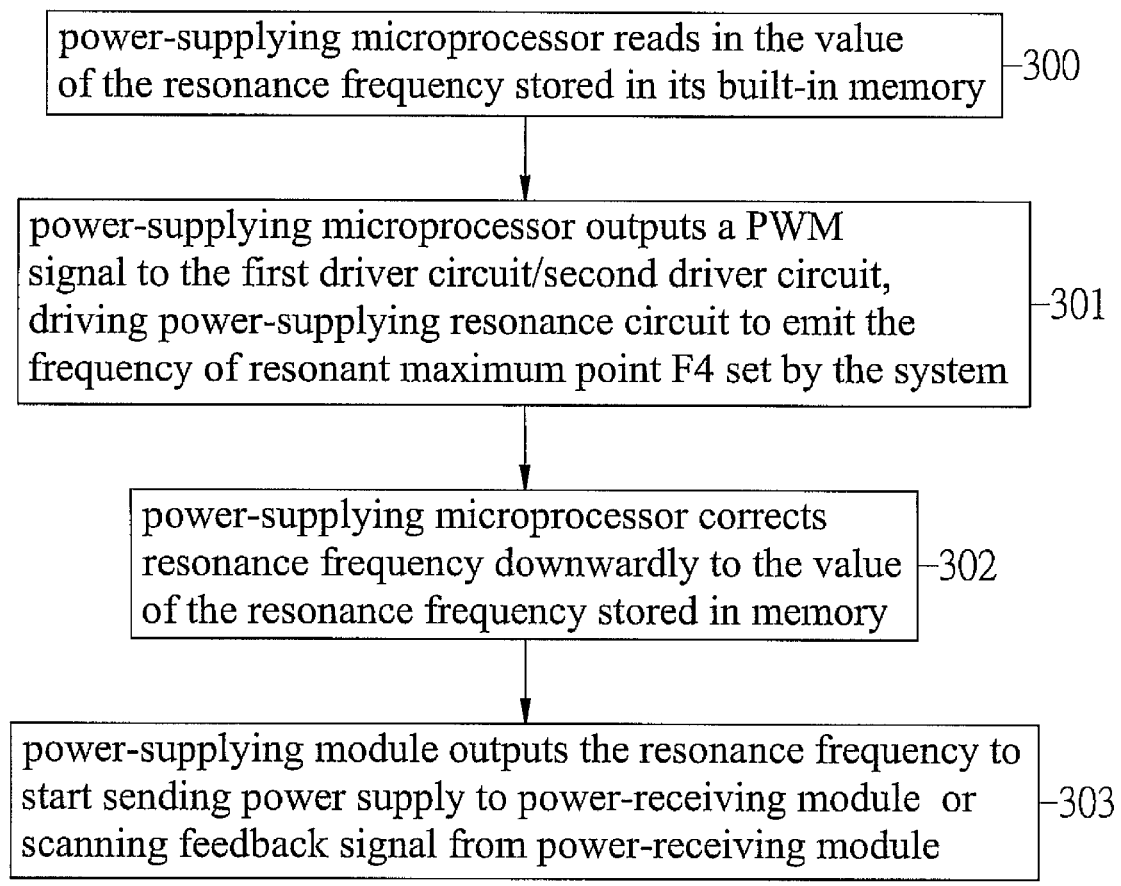
FIG. 5 is an operation flow chart of the PWM signal output operation of the power-supplying module of the high-power wireless induction power supply system in accordance with the present invention.
Figure 6:
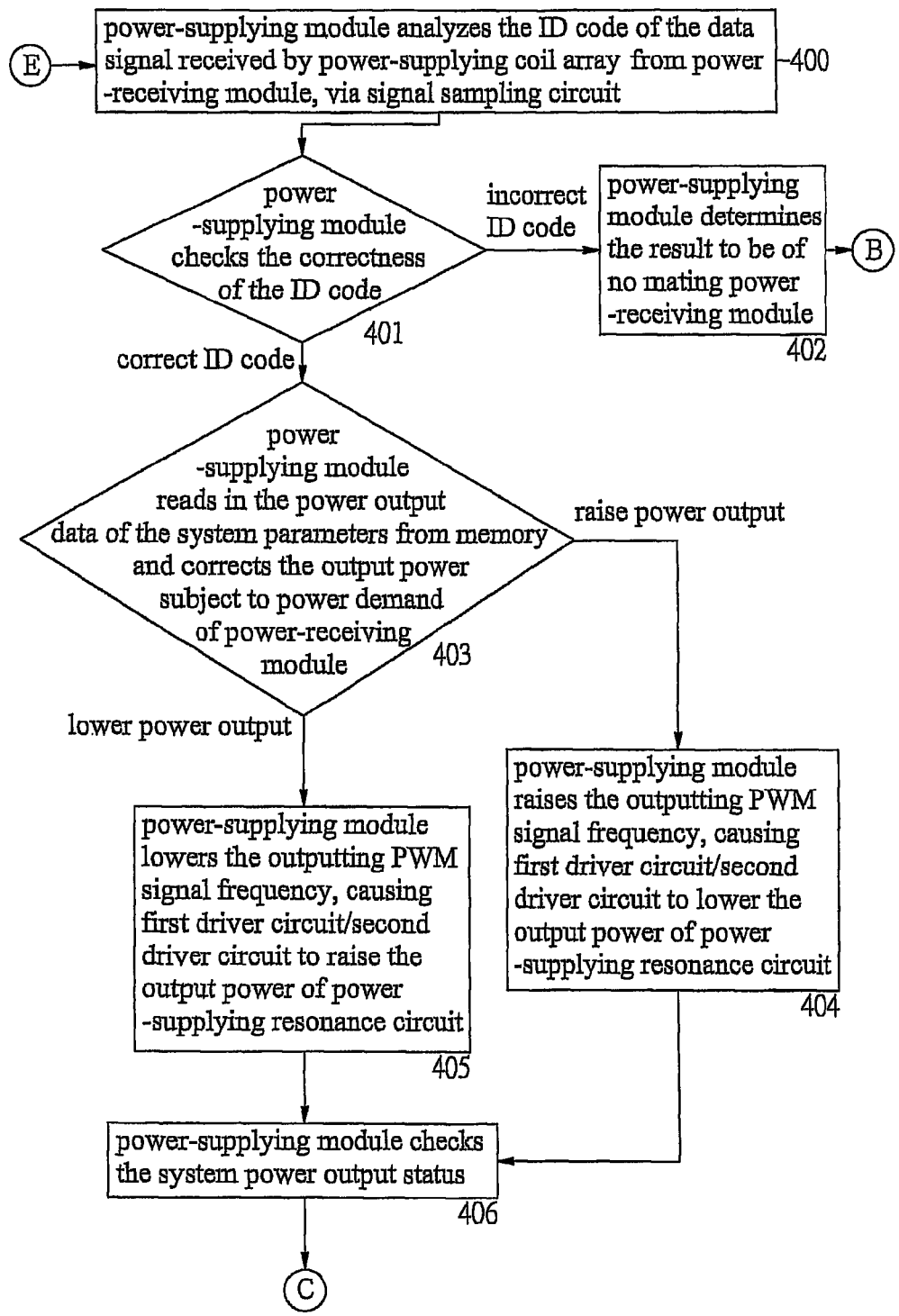
FIG. 6 is an operation flow chart of the present invention, illustrating the operation of the power-supplying module of the high-power wireless induction power supply system in receiving data signal from the power-receiving module (I).
Figure 7:
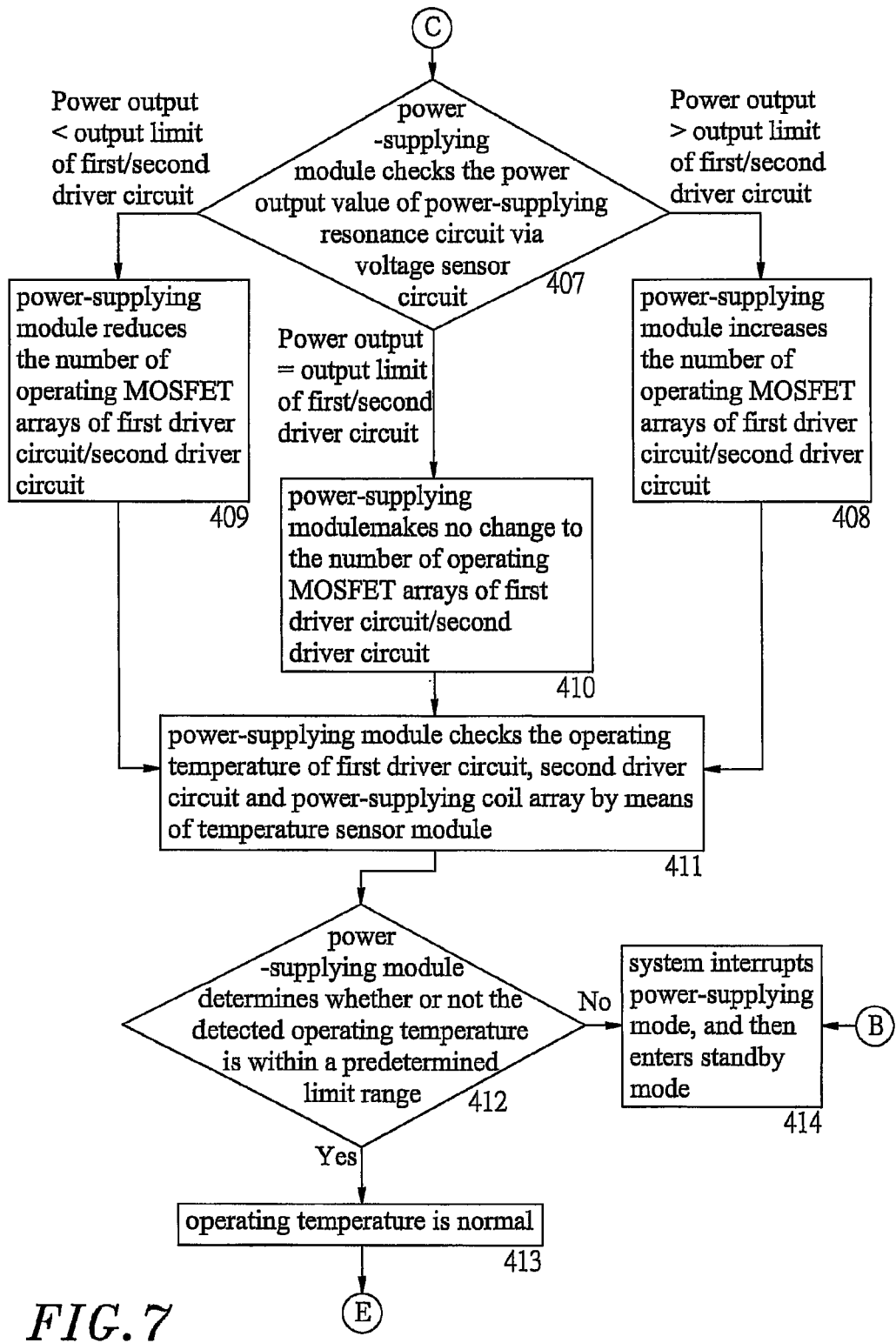
FIG. 7 is an operation flow chart of the present invention, illustrating the operation of the power-supplying module of the high-power wireless induction power supply system in receiving data signal from the power-receiving module (II).
Figure 8:
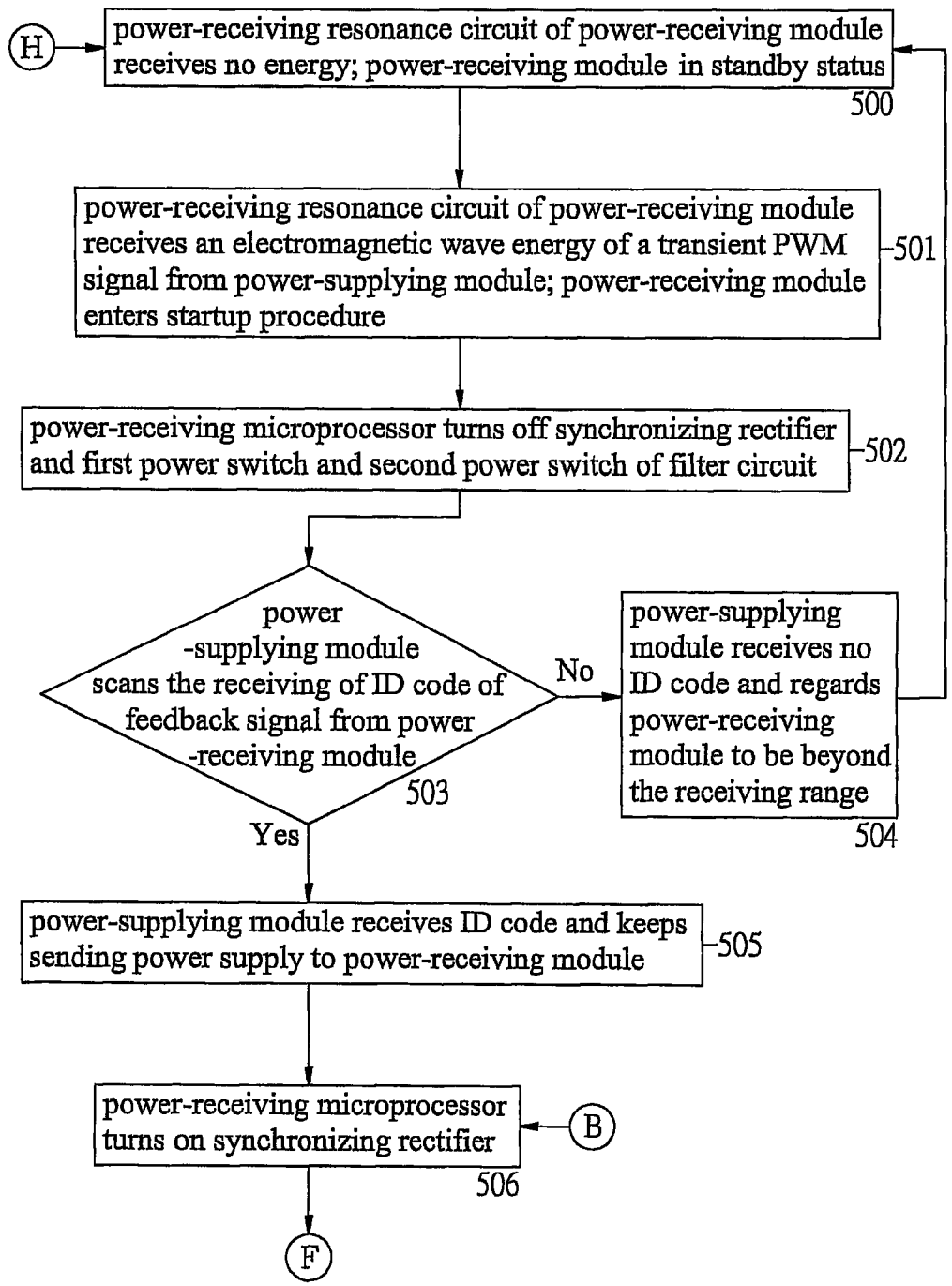
FIG. 8 is an operation flow chart of the present invention, illustrating the operation of the power-receiving module of the high-power wireless induction power supply system in receiving electromagnetic wave energy from the power-supplying module (I).
Figure 9:
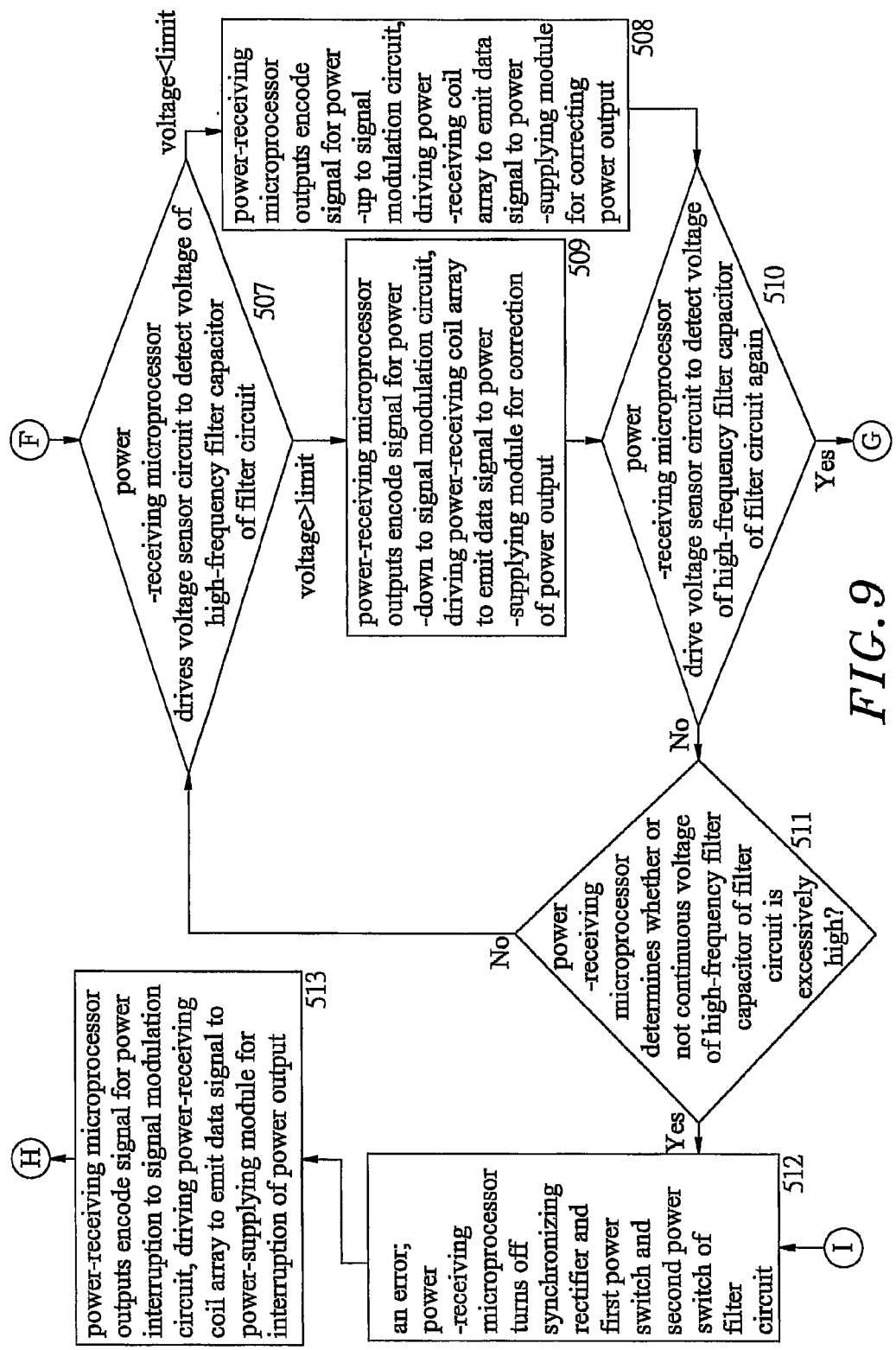
FIG. 9 is an operation flow chart of the present invention, illustrating the operation of the power-receiving module of the high-power wireless induction power supply system in receiving electromagnetic wave energy from the power-supplying module (II).
Figure 10:
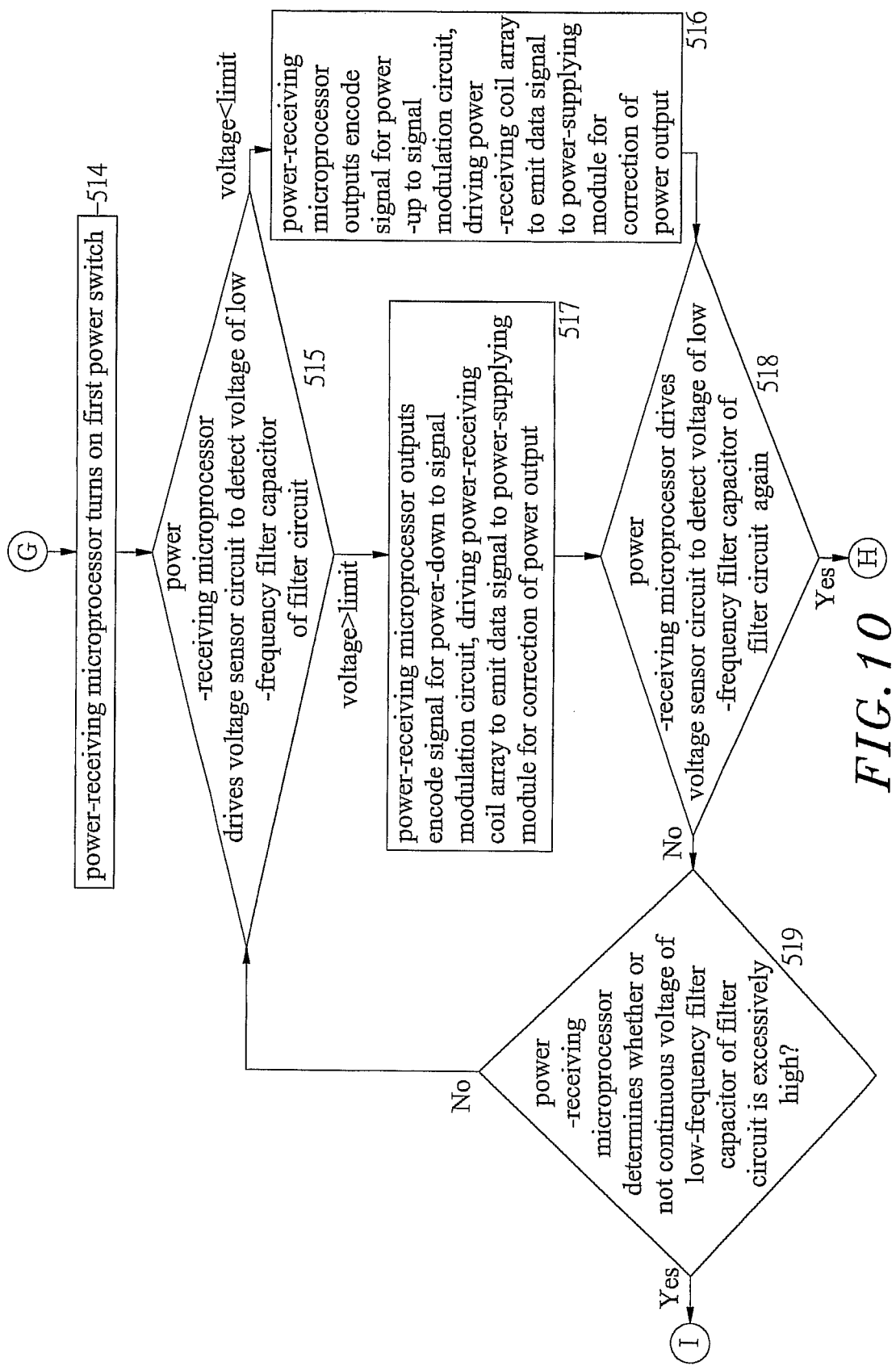
FIG. 10 is an operation flow chart of the present invention, illustrating the operation of the power-receiving module of the high-power wireless induction power supply system in receiving electromagnetic wave energy from the power-supplying module (III).
Figure 11:
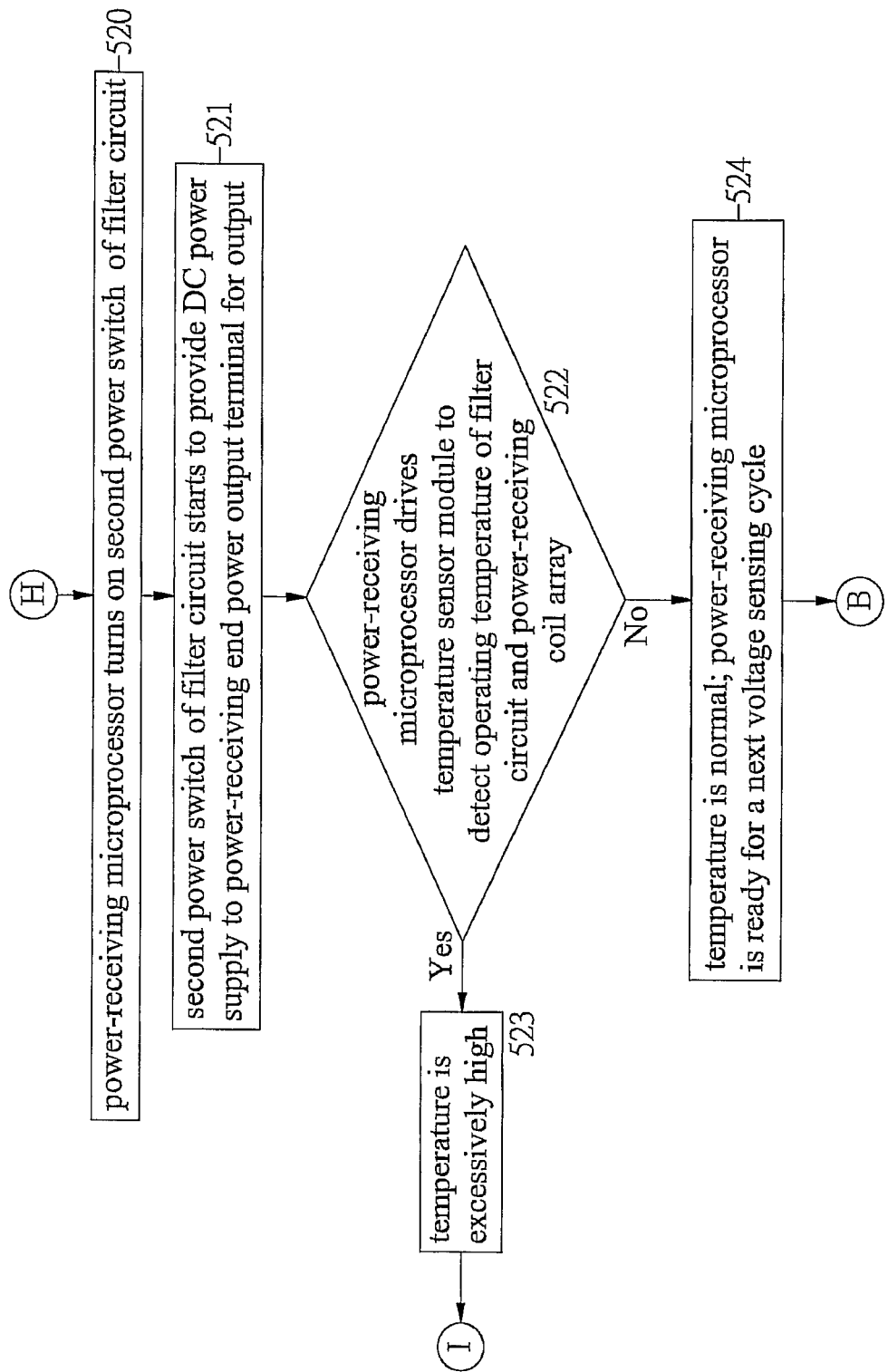
FIG. 11 is an operation flow chart of the present invention, illustrating the operation of the power-receiving module of the high-power wireless induction power supply system in receiving electromagnetic wave energy from the power-supplying module (IV).
Figure 12:
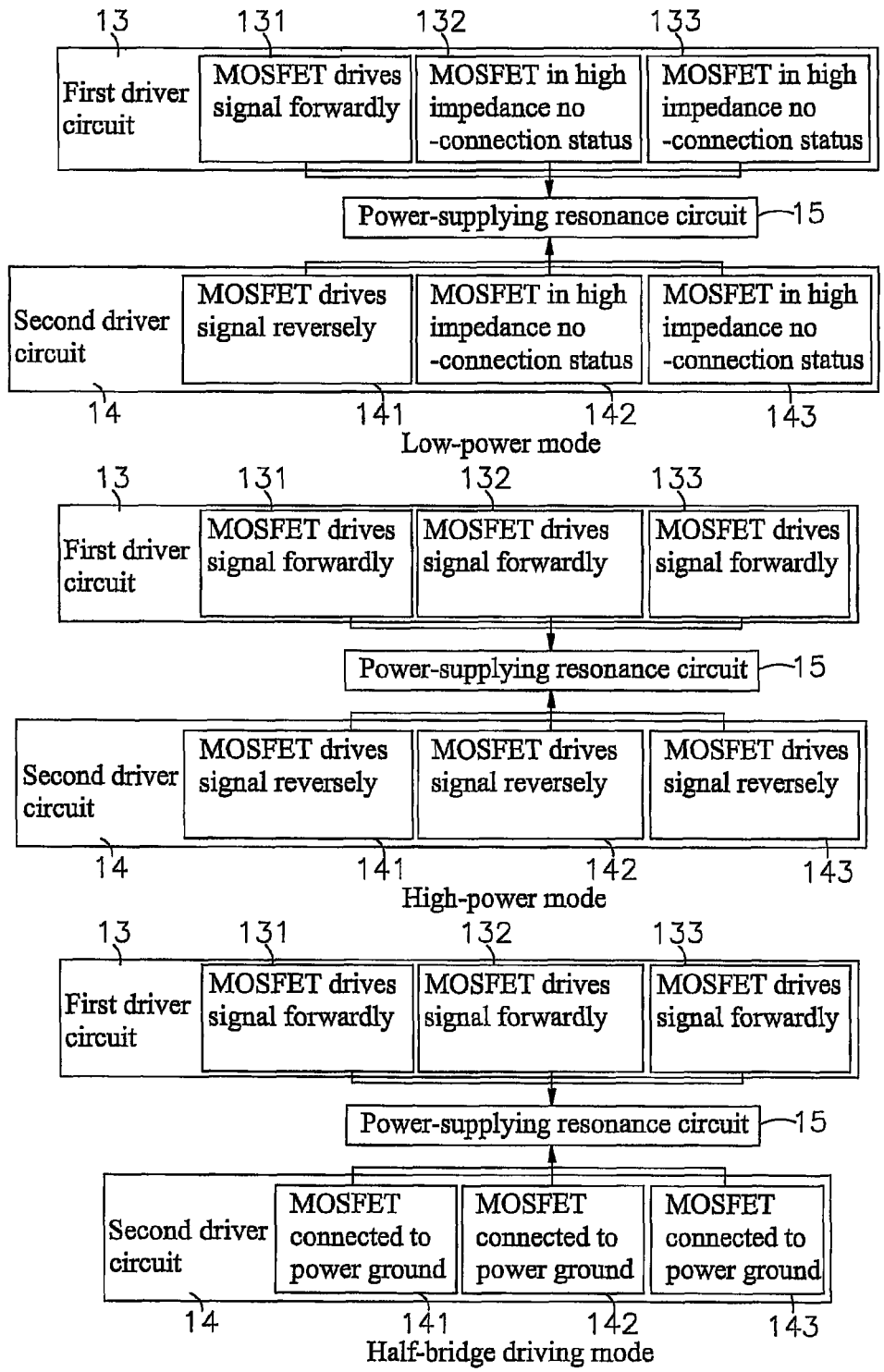
FIG. 12 is a simple power output block diagram of the present invention.
Figure 13:
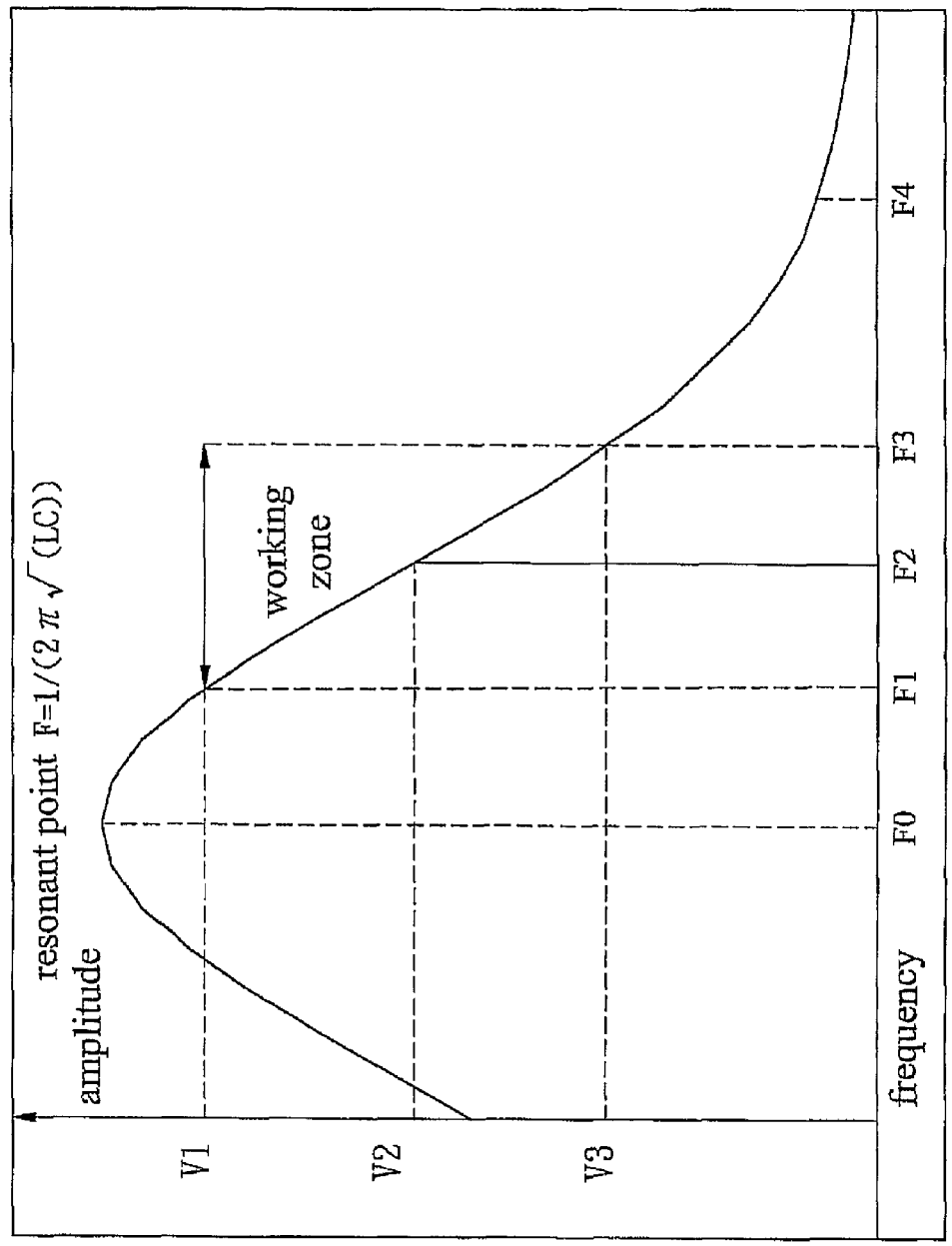
FIG. 13 is a resonance frequency-vs-amplitude curve of the present invention.
Figure 14:
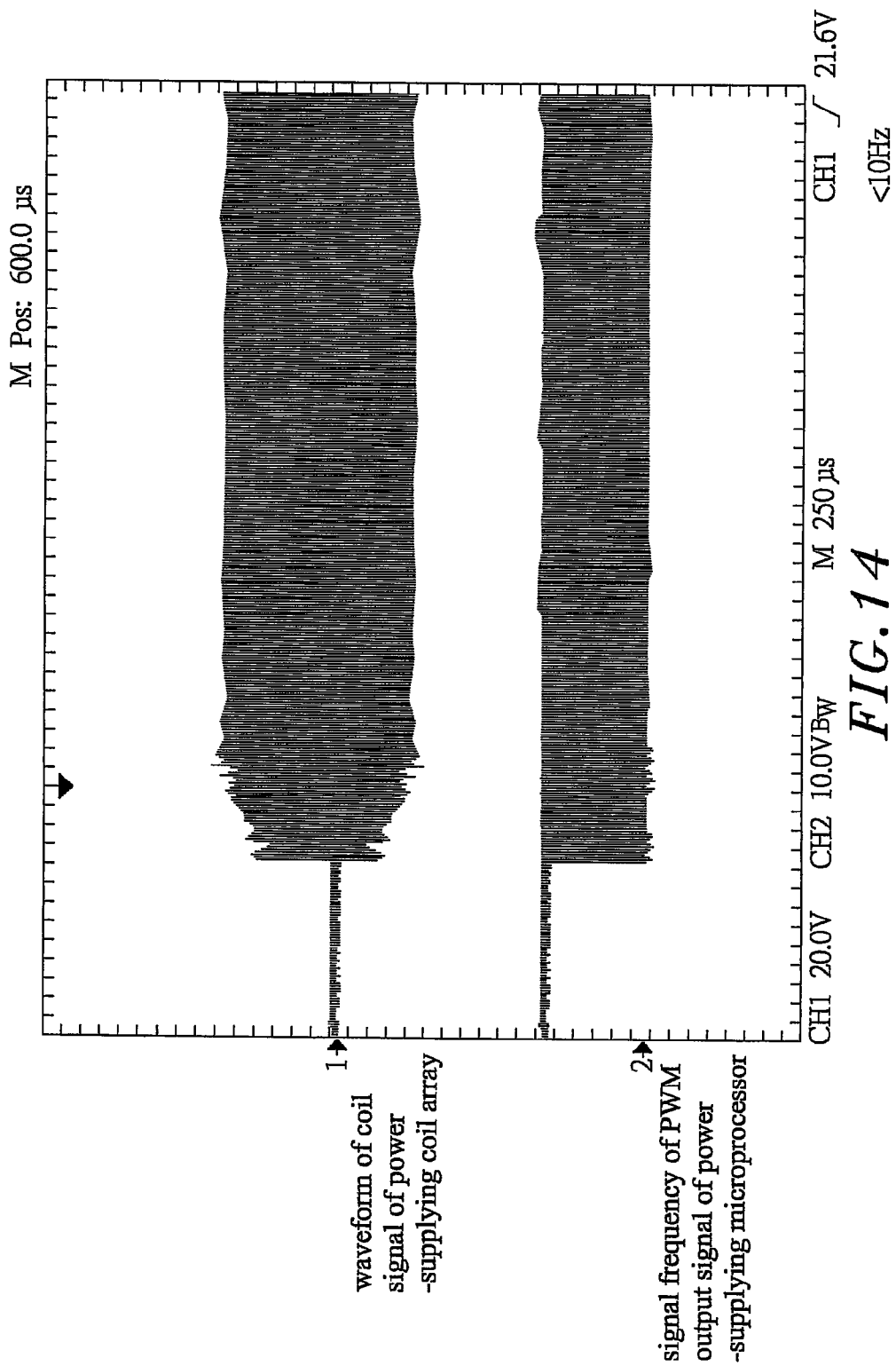
FIG. 14 is a resonance frequency waveform chart of the present invention (I).
Figure 15:
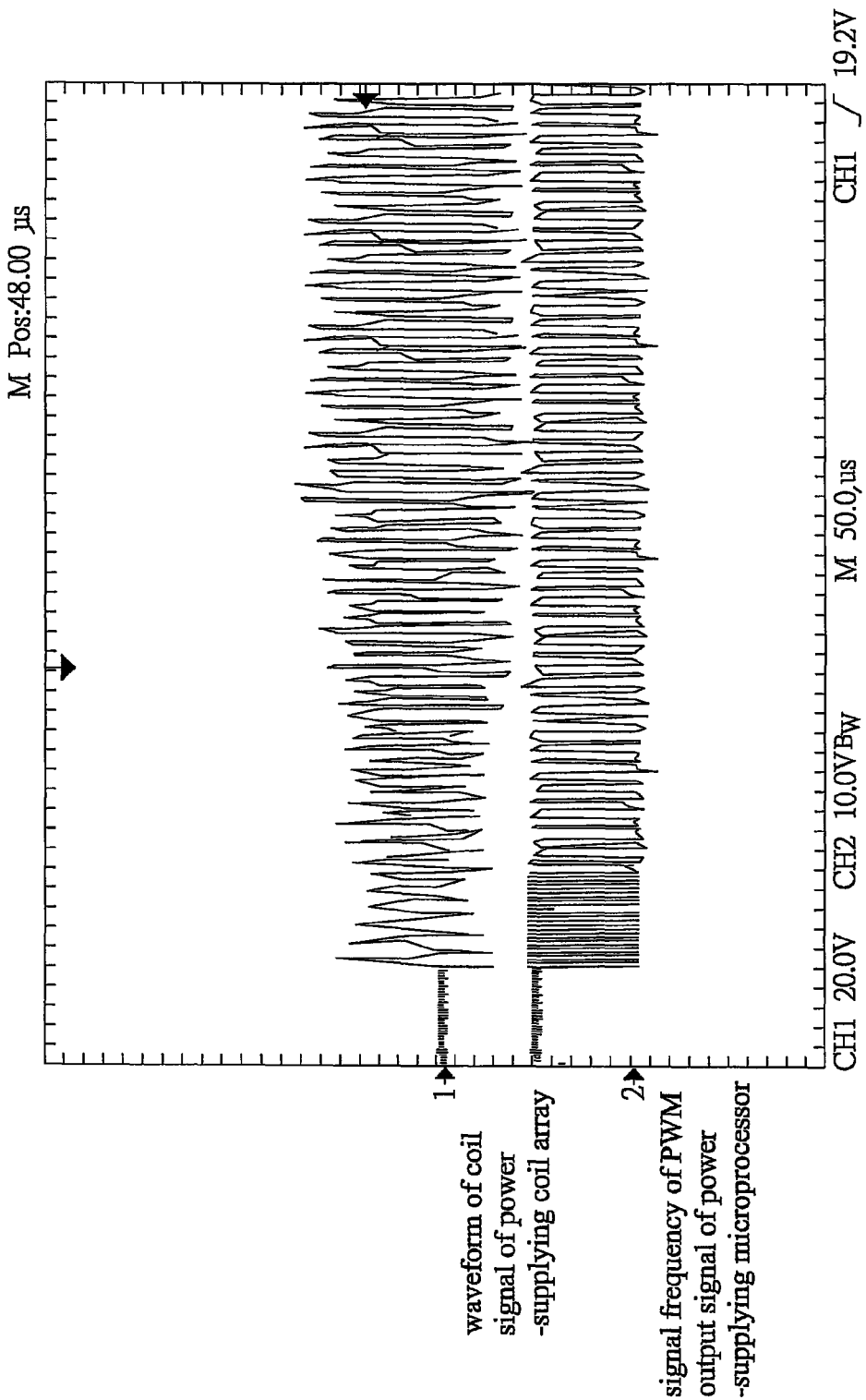
FIG. 15 is a resonance frequency waveform chart of the present invention (II).

Referring to FIGS. 1 and 2, a high-power wireless induction power supply system is shown comprising a power-supplying module 1 and a power-receiving module 2.

The power-supplying module 1 comprises a power-supplying microprocessor 11 having installed therein an operation/control related software program and memory means, a power circuit 12 electrically connected to the power-supplying microprocessor 11 and electrically connectable to an external power source 121, a first driver circuit 13 and a second driver circuit 14 each consisting of a plurality of parallelly connected MOSFET (Metal-Oxide-Semiconductor Field-Effect Transistor) arrays 131;132;133 or 141;142; 143 and electrically connected in parallel to the power-supplying microprocessor 11, a power-supplying resonance circuit 15 electrically connected to the first driver circuit 13 and consisting of a capacitor array 151 and a power-supplying coil array 152 that is adapted for receiving power supply from the second driver circuit 14 and emitting power energy, a signal sampling circuit 16 electrically connected to the power-supplying coil array 152, a data analysis circuit 161 electrically connected between the power-supplying microprocessor 11 and the signal sampling circuit 16, a voltage sensor circuit 17 having its one end electrically connected with the data analysis circuit 161 to the power-supplying microprocessor 11 and its other end electrically connected to the signal sampling circuit 16 in a parallel manner relative to the data analysis circuit 161, a temperature sensor module 18 electrically connected to the power-supplying microprocessor 11 and adapted for sensing the temperature of the first driver circuit 13, the second driver circuit 14 and the power-supplying coil array 152 and an indicator device 19 electrically connected to the power-supplying microprocessor 11. The indicator device 19 comprises a sound module 191 adapted for providing a warning sound or speech, and a display unit 192 adapted for displaying operating status.

The power-receiving module 2 comprises a power-receiving microprocessor 21 having installed therein an operation/control related software program and memory means, a power-receiving resonance circuit 22 electrically connected to the power-receiving microprocessor 21 and comprising a power-receiving coil array 221 adapted for receiving power energy emitted by the power-supplying coil array 152 of the power-supplying module 1 and a primary resonant capacitor 222 and a secondary resonant capacitor 223 electrically connected in parallel to the power-receiving coil array 221, a synchronizing rectifier 23 electrically connected to the primary resonant capacitor 222, a low-power voltage stabilizer 224 electrically connected to the secondary resonant capacitor 223 and adapted for providing a low voltage to the power-supplying module 1 and the synchronizing rectifier 23, a filter circuit 24 electrically connected to the synchronizing rectifier 23 and comprising a high-frequency filter capacitor 241, a first power switch 242, a low-frequency filter capacitor 243 and a second power switch 244, a power-receiving end power output terminal 25 electrically connected to the second power switch 244 for DC power output, a voltage sensor circuit 26 having two input ends respectively electrically connected to the high-frequency filter capacitor 241 and the low-frequency filter capacitor 243 and an output end electrically connected to the power-receiving microprocessor 21 and adapted for sensing the voltage of the high-frequency filter capacitor 241 and the voltage of the low-frequency filter capacitor 243 and providing the sensed voltage signal to the power-receiving microprocessor 21 for enabling the power-receiving microprocessor 21 to switch the first power switch 242 or the second power switch 244 for output of DC power supply from the high-frequency filter capacitor 241 or the low-frequency filter capacitor 243 to the power-receiving end power output terminal 25, a signal modulation circuit 27 electrically connected to the power-receiving microprocessor 21 and adapted for modulating encoded signal from the power-receiving microprocessor 21 for enabling the power-receiving coil array 221 to transmit a data signal to the power-supplying module 1 wirelessly for judgment of power output level, and a temperature sensor module 28 electrically connected to the power-receiving microprocessor 21 and adapted for sensing the operating temperature of the filter circuit 24 and the power-receiving coil array 221.

When transmitting power supply, the high-power wireless induction power supply system runs subject to the following steps:

(100) System starts up system initialization; the power-supplying microprocessor 11 runs built-in program and reads in system parameters from its built-in memory immediately after initialization of the system.

(101) Scan coil resonant points where the power-supplying microprocessor 11 automatically scans the frequency F0 of the resonant maximum point of the capacitor array 151 and power-supplying coil array 152 of the power supply resonance circuit 15, the frequency of resonant minimum point F1 defined by the system, the system operation normal resonance frequency F2, the system operation maximum resonance frequency F3 and the frequency of resonant maximum point F4 outputted by the power-supplying microprocessor 11.

(102) The power-supplying microprocessor 11 stores the respective frequency values in its built-in memory.

(103) The system enters the standby mode in which the power-supplying microprocessor 11 does not output any PWM signal to the first driver circuit 13 and the second driver circuit 14, the power-supplying resonance circuit 15 does not emit any electromagnetic energy, and the system starts to count a predetermined clock cycle.

(104) The time of the clock cycle is up, and the power-supplying microprocessor 11 outputs a transient PWM signal to the first driver circuit 13 and the second driver circuit 14, causing the power-supplying resonance circuit 15 to emit electromagnetic energy for delivering power supply.

(105) The signal sampling circuit 16 detects the power-supplying coil array 152 to check whether or not there is any feedback data signal received from the power-receiving module 2, and then the system proceeds to step (106) when the signal sampling circuit 16 receives a feedback data signal from the power-receiving module 2, or returns to step (103) when the signal sampling circuit 16 receives no signal.

(106) The system enters the power-supplying mode. At this time, the power-supplying microprocessor 11 outputs a continuous PWM signal to the first driver circuit 12/second driver circuit 14, causing the power-supplying resonance circuit 15 to emit electromagnetic energy and to transmit power supply to the power-receiving module 2.

(107) The system interrupts the power-supplying mode and enters the standby mode when system abnormal or signal from the power-receiving end is off, and then repeats step (103).

As stated above, the high-power wireless induction power supply system consists of the aforesaid power-supplying module 1 and power-receiving module 2. Further, the power circuit 12 of the power-supplying module 1 can be connected to an external power source 121 by a power input interface (such as USB connector, AC-to-DC adapter or electrical power plug for city power supply) so that AC power supply provided by the external power source 121 can be converted into stabilized DC power supply and transmitted to the power-supplying module 1 by the power circuit 12. High-voltage power supply is provided to the first driver circuit 13 that consists of a plurality of parallelly connected MOSFET (Metal-Oxide-Semiconductor Field-Effect Transistor) arrays 131;132;133, and the second driver circuit 14 that consists of parallelly connected MOSFET (Metal-Oxide-Semiconductor Field-Effect Transistor) arrays 141;142;143. During the power-supplying mode, the power-supplying module 1 outputs a PWM (Pulse Width Modulation) signal to the first driver circuit 13/second driver circuit 14, controlling the MOSFET arrays 131;132;133/MOSFET arrays 141;142;143 to drive the capacitor array 151 and power-supplying coil array 152 of the power supply resonance circuit 15 in generating electromagnetic energy to the power-receiving terminal of the power-receiving module 2. At this time, the system can convert the data signal received from the signal sampling circuit 16 into digital signal and analyze the signal by means of the data analysis circuit 161, and detect the voltage level of the output power of the power supply resonance circuit 15 by means of the voltage sensor circuit 17. The output signal of the data analysis circuit 161 the output signal of the voltage sensor circuit 17 are transmitted to the power-supplying microprocessor 11, enabling the power-supplying microprocessor 11 to determine whether or not to transmit power supply to the power-receiving module 2.

Further, by means of the temperature sensor module 18, the power-supplying microprocessor 11 can detect the operating temperature of the first driver circuit 13, the second driver circuit 14 and the power-supplying coil array 152. When a temperature abnormality occurs, the system turns off the first driver circuit 13 or second driver circuit 14 by means of the power-supplying microprocessor 11, or changes the number of the operating MOSFET arrays 131;132;133/MOSFET arrays 141;142;143. At the same time, the sound module 191 and display unit 192 of the indicator device 19 are driven by the power-supplying microprocessor 11 to provide audio and video warning signals respectively. Further, the sound module 191 can be a speaker or buzzer module; the display unit 192 can be a LED indicator light set, 7-segment display or LCD module capable of displaying the corresponding system time, power supplying time and different power supplying status for enabling the user to know the current operating status of the system Further, when scanning the resonant points of the coils, the power-supplying module 1 runs subject to the following steps:

(200) The power-supplying microprocessor 11 reads in the maximum resonance frequency from the system parameters stored in its built-in memory.

(201) The power-supplying microprocessor 11 outputs a PWM signal to the first driver circuit 13/second driver circuit 14 to drive the power-supplying resonance circuit 15.

(202) The power-supplying microprocessor 11 scans the coil signal amplitude of the capacitor array 151 and power-supplying coil array 152 of the power-supplying resonance circuit 15 by means of automatic frequency variation.

(203) The power-supplying microprocessor 11 compares the scanned coil signal amplitude with the system parameter, and then proceeds to step (204) if the scanned coil signal amplitude surpassed the system parameter, or step (205) when the scanned coil signal amplitude is below the range of the system parameter, or step (206) when the scanned coil signal amplitude is within the range of the system parameter.

(204) The power-supplying microprocessor 11 raises the resonance frequency to move the coil signal amplitude toward the system operation maximum resonance frequency F3, and then repeats step (201).

(205) The power-supplying microprocessor 11 lowers the resonance frequency to move the coil signal amplitude toward the frequency of resonant minimum point F1 defined by the system, and then repeats step (201).

(206) The power-supplying microprocessor 11 stores the value of the resonance frequency in its built-in memory for use as the system operation normal resonance frequency F2.

Further, when the tie of the clock cycle is up, the power-supplying microprocessor 11 outputs a transient PWM signal to the first driver circuit 13/second driver circuit 14 to drive the power-supplying resonance circuit 15 in emitting electromagnetic wave energy subject to the following steps:

(300) The power-supplying microprocessor 11 reads in the value of the resonance frequency stored in its built-in memory.

(301) The power-supplying microprocessor 11 outputs a PWM signal to the first driver circuit 13/the second driver circuit 14, driving the power-supplying resonance circuit 15 to emit the frequency of resonant maximum point F4 set by the system.

(302) The power-supplying microprocessor 11 corrects the resonance frequency downwardly to the value of the resonance frequency stored in its built-in memory.

(303) The power-supplying module 1 outputs the resonance frequency to start sending power supply to the power-receiving module 2 or scanning feedback signal from the power-receiving module 2.

When the power-supplying module 1 received a data signal from the power-receiving terminal of the power-receiving module 2, the system enters the power-supplying mode and runs subject to the following steps:

(400) The power-supplying module 1 analyzes the ID code of the data signal received by the power-supplying coil array 152 from the power-receiving module 2, via the signal sampling circuit 16.

(401) The power-supplying module 1 checks the correctness of the ID code, and then proceeds to step (402) when the ID code is incorrect, or step (403) when the ID code is correct.

(402) The power-supplying module 1 determines the result to be of no mating power-receiving module 2, and then proceeds to step (414).

(403) The power-supplying module 1 reads in the power output data of the system parameters from its built-in memory and corrects the output power subject to the power demand of the power-receiving module 2, and then proceeds to step (404) if the power demand is to lower the output power, or step (405) if the power demand is to raise the output power.

(404) The power-supplying module 1 raises the outputting PWM signal frequency, causing the first driver circuit 13/second driver circuit 14 to lower the output power of the power-supplying resonance circuit 15, and then proceeds to step (406).

(405) The power-supplying module 1 lowers the outputting PWM signal frequency, causing the first driver circuit 13/second driver circuit 14 to raise the output power of the power-supplying resonance circuit 15, and then proceeds to step (406).

(406) The power-supplying module 1 checks the system power output status.

(407) The power-supplying module 1 checks the power output value of the power-supplying resonance circuit 15 via the voltage sensor circuit 17, and then proceeds to step (408) if the power output value surpasses the limited output range of the first driver circuit 13/second driver circuit 14, or step (409) if the power output value is below the limited output range of the first driver circuit 13/second driver circuit 14, or step (410) if the power output value is within the limited output range of the first driver circuit 13/second driver circuit 14.

(408) The power-supplying module 1 increases the number of the operating MOSFET arrays 131;132;133/MOSFET arrays 141;142;143 of the first driver circuit 13/second driver circuit 14, and then proceeds to step (411).

(409) The power-supplying module 1 reduces the number of the operating MOSFET arrays 131;132;133/MOSFET arrays 141;142;143 of the first driver circuit 13/second driver circuit 14, and then proceeds to step (411).

(410) The power-supplying module 1 makes no change to the number of the operating MOSFET arrays 131;132;133/MOSFET arrays 141;142;143 of the first driver circuit 13/second driver circuit 14, and then proceeds to step (411).

(411) The power-supplying module 1 checks the operating temperature of the first driver circuit 13, the second driver circuit 14 and the power-supplying coil array 152 by means of the temperature sensor module 18.

(412) The power-supplying module 1 determines whether or not the detected operating temperature is within a predetermined limit range, and then proceeds to step (413) when positive, or step (414) when negative.

(413) The operating temperature is normal, and the system returns to step (400).

(414) The system interrupts the power-supplying mode, and then enters the standby mode.

When the power-receiving module 2 starts to receive the electromagnetic wave energy emitted by the power-supplying module 1, the system runs subject to the following steps:

(500) The power-receiving resonance circuit 22 of the power-receiving module 2 receives no energy; the power-receiving module 2 is in the standby status.

(501) The power-receiving resonance circuit 22 of the power-receiving module 2 receives an electromagnetic wave energy of a transient PWM (Pulse Width Modulation) signal from the power-supplying module 1; the power-receiving module 2 enters the startup procedure.

(502) The power-receiving microprocessor 21 turns off the synchronizing rectifier 23 and the first power switch 242 and second power switch 244 of the filter circuit 24.

(503) The power-supplying module 1 scans the receiving of an ID code of a feedback signal from the power-receiving module 2; the system proceeds to step (504) when no ID code is received by the power-supplying module 1, or step (505) when the correct ID code is received.

(504) The power-supplying module 1 receives no ID code and regards the power-receiving module 2 to be beyond the receiving range; the system repeats step (500).

(505) The power-supplying module 1 receives the ID code and keeps sending power supply to the power-receiving module 2.

(506) The power-receiving microprocessor 21 turns on the synchronizing rectifier 23.

(507) The power-receiving microprocessor 21 drives the voltage sensor circuit 26 to detect the voltage of the high-frequency filter capacitor 241 of the filter circuit 24, and then proceeds to step (508) if the detected voltage is below the predetermined limit, or step (509) if the detected voltage is above the predetermined limit.

(508) The power-receiving microprocessor 21 outputs an encode signal for power-up to the signal modulation circuit 27, driving the power-receiving coil array 221 to emit a data signal to the power-supplying module 1 for correcting power output, and then proceeds to step (510).

(509) The power-receiving microprocessor 21 outputs an encode signal for power-down to the signal modulation circuit 27, driving the power-receiving coil array 221 to emit a data signal to the power-supplying module 1 for correction of power output.

(510) The power-receiving microprocessor 21 drives the voltage sensor circuit 26 to detect the voltage of the high-frequency filter capacitor 241 of the filter circuit 24 again, and then proceeds to step (514) if the detected voltage is within the predetermined limit, or step (511) if the detected voltage is not within the predetermined limit.

(511) The power-receiving microprocessor 21 determines whether or not the continuous voltage of the high-frequency filter capacitor 241 of the filter circuit 24 is excessively high. And then the power-receiving microprocessor 21 repeats step (507) if it is not excessively high, or proceeds to step (512) if it is excessively high.

(512) It is determined to be an error; the power-receiving microprocessor 21 turns off the synchronizing rectifier 23 and the first power switch 242 and second power switch 244 of the filter circuit 24.

(513) The power-receiving microprocessor 21 outputs an encode signal for power interruption to the signal modulation circuit 27, driving the power-receiving coil array 221 to emit a data signal to the power-supplying module 1 for interruption of power output, and then repeats step (500).

(514) The power-receiving microprocessor 21 turns on the first power switch 242.

(515) The power-receiving microprocessor 21 drives the voltage sensor circuit 26 to detect the voltage of the low-frequency filter capacitor 243 of the filter circuit 24, and then proceeds to step (516) if the detected voltage is below the range of the predetermined limit, or step (517) if the detected voltage is above the range of the predetermined limit.

(516) The power-receiving microprocessor 21 outputs an encode signal for power-up to the signal modulation circuit 27, driving the power-receiving coil array 221 to emit a data signal to the power-supplying module 1 for correction of power output, and then proceeds to step (518).

(517) The power-receiving microprocessor 21 outputs an encode signal for power-down to the signal modulation circuit 27, driving the power-receiving coil array 221 to emit a data signal to the power-supplying module 1 for correction of power output.

(518) The power-receiving microprocessor 21 drives the voltage sensor circuit 26 to detect the voltage of the low-frequency filter capacitor 243 of the filter circuit 24 again, and then proceeds to step (519) if the detected voltage is not within the predetermined limit, or step (520) if the detected voltage is within the predetermined limit.

(519) The power-receiving microprocessor 21 determines whether or not the continuous voltage of the low-frequency filter capacitor 243 of the filter circuit 24 is excessively high. And then, the power-receiving microprocessor 21 repeats step (515) if it is not excessively high, or proceeds to step (512) if it is excessively high.

(520) The power-receiving microprocessor 21 turns on the second power switch 244 of the filter circuit 24.

(521) The second power switch 244 of the filter circuit 24 starts to provide DC power supply to the power-receiving end power output terminal 25 for output.

(522) The power-receiving microprocessor 21 drives the temperature sensor module 28 to detect the operating temperature of the filter circuit 24 and the power-receiving coil array 221, and then proceeds to step (523) if the detected value surpasses the predetermined limit, or step (524) if the detected value does not surpasses the predetermined limit.

(523) The temperature is excessively high, and the power-receiving microprocessor 21 repeats step (512).

(524) The temperature is normal; the power-receiving microprocessor 21 is ready for a next voltage sensing cycle and then repeats step (506).

As stated above, the first driver circuit 13/second driver circuit 14 of the power-supplying module 1 uses multiple MOSFET arrays 131;132;133/MOSFET arrays 141;142;143 to disperse the current passing therethrough. The effect of the equivalent parallel resistance effectively lowers the impedance value of the electronic components, avoiding overheat.

Further, in view of the drawbacks of the prior art techniques that use two MOSFET arrays to drive a resonance circuit either in the full-bridge mode where the voltage is doubled, or the half-bridge mode where one array is used for driving signal and the other array is for grounding. However, RDS (ON) of MOSFET causes a rise in temperature upon passing of a large current, and the electronic component may be burned out. The invention eliminates this problem. If the temperature of either one of the MOSFET arrays 131;132; 133/MOSFET arrays 141;142;143 is excessively high before burning, the temperature status will be detected by the power-supplying microprocessor 11 by means of the temperature sensor module 18, and the troubled one of the MOSFET array s131;132;133/MOSFET arrays 141;142;143 will be turned off by the power-supplying microprocessor 11. At the time, the power-supplying microprocessor 11 will send a signal to the indicator device 19, causing the indicator device 19 to provide audio and video warning signals. Further, the number of the operating MOSFET arrays 131;132;133/MOSFET arrays 141;142;143 may be changed subject to power demand, i.e., to increase the number of operating MOSFETS so as to lower the impedance and temperature upon output of a high power, or to reduce the number of operating MOSFETS so as to reduce power loss of switch device upon output of a low power.

Further, the ideal characteristic of the capacitor array 151 of the power supply resonance circuit 15 in AC signal is ON. However, in a real product, there is an AC impedance in capacitor property. The AC impedance may be reduced subject to improvement of material technology, however the application of an improved material technology may relatively increase the cost. The capacitor array 151 of the power supply resonance circuit 15 in accordance with the present invention is to have multiple capacitors be connected in parallel, lowering the impedance, i.e., the invention uses inexpensive electronic devices to achieve the same effects of expensive low-impedance electronic devices.

The power-supplying coil array 152 of the power supply resonance circuit 15 must have a low impedance for high power application. To meet the requirement for low impedance, it is normally to use a thick wire material. According to the known techniques, Litz wire is commonly used to make coils for high-frequency application to reduce the impedance and the skin effect. However, there is a thickness limitation when using Litz wire in a coil winding machine for making coils. By means of stacking up power-supplying coils or connecting power-supplying coils in parallel to form the desired power-supplying coil array 152, the invention greatly reduces the coil impedance. Therefore, the fabrication of the ideal high-power coils is free from the constraint of conventional techniques.

In the high-power wireless induction power supply system, the problem of overheat of electronic components is reduced by means of performance improvement. The performance improvement is to lower the impedance of the switch driver and the capacitors and coils of the resonance circuit. Lowering the impedance of the electronic components during passing of an electric current can reduce the power loss and the skin effect. In actual practice, due to limitations of manufacturing techniques, the cost of low impedance electronic components is quite high, not suitable for use in low-price products. By means of parallel design to match with the operation software, the invention can provide power supply safely in a wireless manner, and can also regulate the power output subject to the real-time condition of the load. The invention can also monitor the voltage and temperature at multiple points during wireless transmission of power supply, and interrupts the system and gives audio and video warning signals upon a system abnormality.

Referring to FIGS. 12~15, the resonance frequency of the power supply resonance circuit 15 runs subject to automatic frequency modulation, and the frequency at every resonant point is defined as follows:

F0: The frequency of the resonant maximum point of the capacitor array 151 and power-supplying coil array 152 of the power supply resonance circuit 15 that varies with the inductive value of the capacitor array 151 and change of surroundings. If the power-supplying module 1 operates at this point, the amplitude will be very high and an overload may occur. Therefore, the software architecture of the power-supplying microprocessor 11 of the invention avoids output of the frequency of this resonant maximum point.

F1: The frequency of resonant minimum point defined by the system.

F2: The system operation normal resonance frequency, which is defined by the system predetermined maximum operation amplitude V2.

F3: The system operation maximum resonance frequency, which is defined by the system predetermined maximum operation amplifude V3.

F4: The frequency of resonant maximum point of the output of the power-supplying microprocessor 11.

In order to avoid insufficient power output or overload, it is necessary to define the operational frequency range, and therefore continuous scanning by automatic frequency modulation and follow-up correction are performed to control output power. The scanning is performed by means of outputting the frequency of resonant maximum point F4 at first and then lowers the frequency gradually. In consequence, the coil signal amplitude is getting better and will pass in proper order through V3, V2, V1. When reached V1, the power-supplying microprocessor 11 immediately stops power output and stores the corresponding resonance frequency value in its built-in memory for use, and then starts to senses the power-receiving module 2 with V2 resonance frequency. In the system, F1, F2, F3 are not fixed values and will be automatically corrected to control the power output subject to the power demand of the power-receiving module 2.

It is to be understood that the above description is simply an example of the present invention and not intended for use as limitations. The frequency modulation is employed during the stage from system zero output till start of output, i.e., output frequency starts from F4 and then drops to the system predetermined resonance frequency F2. Without using this method, the system will shift from the standby mode directly to the output mode of outputting the system predetermined resonance frequency F2, and the resonance circuit will generate an excessively high amplitude and then enters a stabilized status gradually. Further, repeatedly changing from the standby status to the status of starting to send a scanning signal and then returning to the standby status will cause the problem of repeatedly generating an excessively high amplitude, resulting in the problem of current impact to electronic components and the problem of EMI (electromagnetic interference). By means of the application of automatic frequency modulation, the invention enables the coil signal amplitude to be enlarged from the minimum to the stabilized status to optimize power output and to save power consumption without causing any signal surge.

A prototype of power transmission method of high-power wireless induction power supply system has been constructed with the features of FIGS. 1~15. The power transmission method of high-power wireless induction power supply system works smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A power transmission method used in a high-power wireless induction power supply system comprising a power-supplying module and a power-receiving module, said power-supplying module comprising a power-supplying microprocessor having installed therein a software and a memory, a power circuit electrically connected to said power-supplying microprocessor and electrically connectable to an external power source, a first driver circuit and a second driver circuit each consisting of a plurality of parallelly connected MOSFET arrays and electrically connected in parallel to said power-supplying microprocessor, a power-supplying resonance circuit electrically connected to said first driver circuit and consisting of a capacitor array and a power-supplying coil array that is adapted for receiving power supply from said second driver circuit and emitting a power energy, a signal sampling circuit electrically connected to said power-supplying coil array, a data analysis circuit electrically connected between said power-supplying microprocessor and said signal sampling circuit, and a voltage sensor circuit having one end thereof electrically connected with said data analysis circuit to said power-supplying microprocessor and an opposite end thereof electrically connected to said signal sampling circuit in a parallel manner relative to said data analysis circuit, the power transmission method comprising the steps of:

(a1) system starts up system initialization, and said power-supplying microprocessor runs built-in program and reads in system parameters from said memory immediately after initialization of the system;

(a2) system scans coil resonant points where said power-supplying microprocessor automatically scans the frequency of the resonant maximum point of the capacitor array and power-supplying coil array of said power supply resonance circuit, the frequency of resonant minimum point defined by the system, the system operation normal resonance frequency, the system operation maximum resonance frequency and the frequency of resonant maximum point outputted by said power-supplying microprocessor;

(a3) said power-supplying microprocessor stores the respective frequency values in said memory;

(a4) system enters the standby mode in which said power-supplying microprocessor outputs any PWM signal to said first driver circuit and said second driver circuit, said power-supplying resonance circuit emits no electromagnetic energy, and the system starts to count a predetermined clock cycle;

(a5) the time of the clock cycle is up, and said power-supplying microprocessor outputs a transient PWM signal to said first driver circuit and said second driver circuit, causing said power-supplying resonance circuit to emit an electromagnetic energy for delivering power supply;

(a6) system scans data signal status where said signal sampling circuit detects said power-supplying coil array to check the receipt of a feedback data signal from said power-receiving module, and then the system proceeds to step (a7) when said signal sampling circuit receives a feedback data signal from said power-receiving module, or returns to step (a4) when said signal sampling circuit receives no signal;

(a7) system enters the power-supplying mode and then said power-supplying microprocessor outputs a continuous PWM signal to said first driver circuit/said second driver circuit, causing said power-supplying resonance circuit to emit an electromagnetic energy and to transmit power supply to said power-receiving module; and (a8) system interrupts the power-supplying mode and enters the standby mode, and then repeats step (a4).

2. The power transmission method as claimed in claim 1, wherein said step (a2) of scanning coil resonant points comprises the sub-steps of:

(b1) said power-supplying microprocessor reads in the maximum resonance frequency from the system parameters stored in said memory;

(b2) said power-supplying microprocessor outputs a PWM signal to said first driver circuit/said second driver circuit to drive said power-supplying resonance circuit;

(b3) said power-supplying microprocessor scans the coil signal amplitude of said capacitor array and said power-supplying coil array of said power-supplying resonance circuit by means of automatic frequency variation;

(b4) said power-supplying microprocessor compares the scanned coil signal amplitude with the system parameter, and then proceeds to step (b5) if the scanned coil signal amplitude is above the system parameter, or step (b6) if the scanned coil signal amplitude is below the range of the system parameter, or step (b7) if the scanned coil signal amplitude is within the range of the system parameter;

(b5) said power-supplying microprocessor raises the resonance frequency to move the coil signal amplitude toward said system operation maximum resonance frequency, and then repeats step (b2);

(b6) said power-supplying microprocessor lowers the resonance frequency to move the coil signal amplitude toward said frequency of resonant minimum point defined by the system, and then repeats step (b2); and (b7) said power-supplying microprocessor stores the value of the resonance value in said memory for use as the system operation normal resonance frequency.

3. The power transmission method as claimed in claim 1, wherein said step (a5) in which said power-supplying microprocessor outputs a transient PWM signal to said first driver circuit and said second driver circuits comprises the sub-steps of:

(c1) said power-supplying microprocessor reads in the value of the resonance frequency stored in said memory;

(c2) said power-supplying microprocessor outputs a PWM signal to said first driver circuit/said second driver circuit, driving said power-supplying resonance circuit to emit said frequency of resonant maximum point set by the system;

(c3) said power-supplying microprocessor corrects the resonance frequency downwardly to the value of the resonance frequency stored in its built-in memory; and (c4) said power-supplying module outputs the resonance frequency to start sending power supply to said power-receiving module or scanning feedback signal from said power-receiving module.

4. The power transmission method as claimed in claim 1, wherein said power-supplying module further comprises a temperature sensor module electrically connected to said power-supplying microprocessor and adapted for sensing the temperature of said first driver circuit, said second driver circuit and said power-supplying coil array; when said power-supplying module received a data signal from said power-receiving module, the system enters the power-supplying mode and proceeds to said (a7) that comprises the sub-steps of:

(d01) said power-supplying module analyzes the ID code of the data signal received by said power-supplying coil array from said power-receiving module, via said signal sampling circuit;

(d02) said power-supplying module checks the correctness of the ID code, and then proceeds to step (d03) when the ID code is incorrect, or step (d04) when the ID code is correct;

(d03) said power-supplying module determines the result of no mating power-receiving module, and then proceeds to step (d15);

(d04) said power-supplying module reads in the power output data of the system parameters from said memory and corrects the output power subject to the power demand of said power-receiving module, and then proceeds to step (d05) if the power demand is lower the output power, or step (d06) if the power demand is to raise the output power;

(d05) said power-supplying module raises the outputting PWM signal frequency, causing said first driver circuit/said second driver circuit to lower the output power of said power-supplying resonance circuit, and then proceeds to step (d07);

(d06) said power-supplying module lowers the outputting PWM signal frequency, causing said first driver circuit/said second driver circuit to raise the output power of said power-supplying resonance circuit, and then proceeds to step (d07);

(d07) said power-supplying module checks the system power output status;

(d08) said power-supplying module checks the power output value of said power-supplying resonance circuit via said voltage sensor circuit, and then proceeds to step (d09) if the power output value surpasses the limited output range of said first driver circuit/said second driver circuit, or step (d10) if the power output value is below the limited output range of said first driver circuit/said second driver circuit, or step (d11) if the power output value is within the limited output range of said first driver circuit/said second driver circuit;

(d09) said power-supplying module increases the number of the operating MOSFET arrays of said first driver circuit/said second driver circuit, and then proceeds to step (d12);

(d10) said power-supplying module reduces the number of the operating MOSFET arrays of said first driver circuit/said second driver circuit, and then proceeds to step (d12);

(d11) said power-supplying module makes no change to the number of the operating MOSFET arrays of said first driver circuit/said second driver circuit, and then proceeds to step (d12);

(d12) said power-supplying module checks the operating temperature of said first driver circuit, said second driver circuit and said power-supplying coil array by means of said temperature sensor module;

(d13) said power-supplying module determines whether or not the detected operating temperature is within a predetermined limit range, and then proceeds to step (d14) when positive, or step (d15) when negative;

(d14) the operating temperature is normal, and the system returns to step (d01); and (d15) the system interrupts the power-supplying mode, and then enters the standby mode.

5. The power transmission method as claimed in claim 1, wherein said power-receiving module comprises a power-receiving microprocessor, a power-receiving resonance circuit electrically connected to said power-receiving microprocessor and comprising a power-receiving coil array adapted for receiving the power energy emitted by said power-supplying coil array of said power-supplying module and a primary resonant capacitor and a secondary resonant capacitor electrically connected in parallel to said power-receiving coil array, a synchronizing rectifier electrically connected to said primary resonant capacitor, a low-power voltage stabilizer electrically connected to said secondary resonant capacitor and adapted for providing a low voltage to said power-supplying module and said synchronizing rectifier, a filter circuit electrically connected to said synchronizing rectifier and comprising a high-frequency filter capacitor, a first power switch, a low-frequency filter capacitor and a second power switch, a power output terminal electrically connected to the second power switch for DC power output, a voltage sensor circuit having two input ends respectively electrically connected to said high-frequency filter capacitor and said low-frequency filter capacitor and an output end electrically connected to said power-receiving microprocessor and adapted for sensing the voltage of said high-frequency filter capacitor and the voltage of said low-frequency filter capacitor and providing the sensed voltage signal to said power-receiving microprocessor for enabling said power-receiving microprocessor to switch said first power switch or said second power switch for output of DC power supply from said high-frequency filter capacitor or said low-frequency filter capacitor to said power output terminal of said power-supplying module, and a signal modulation circuit electrically connected to said power-receiving microprocessor and adapted for modulating encoded signal from said power-receiving microprocessor for enabling said power-receiving coil array to transmit a data signal to said power-supplying module wirelessly for judgment of power output level; said step (a7) in which the system enters the power-supplying mode and then said power-supplying microprocessor outputs a continuous PWM signal to said first driver circuit/said second driver circuit comprises the sub-steps of:

(d01) said power-receiving resonance circuit of said power-receiving module receives no energy; said power-receiving module is in the standby status;

(d02) said power-receiving resonance circuit of the power-receiving module receives an electromagnetic wave energy of a transient PWM signal from said power-supplying module; said power-receiving module enters the startup procedure;

- (d03) said power-receiving microprocessor turns off said synchronizing rectifier and said first power switch and said second power switch of said filter circuit;
- (d04) said power-supplying module scans the receiving of an ID code of a feedback signal from the power-receiving module;
- the system proceeds to step (d05) when no ID code is received by said power-supplying module, or step (d06) when the correct ID code is received;
- (d05) said power-supplying module receives no ID code and regards said power-receiving module to be beyond the receiving range; the system repeats step (d01);
- (d06) said power-supplying module receives the ID code and keeps sending power supply to said power-receiving module;
- (d07) said power-receiving microprocessor turns on said synchronizing rectifier;
- (d08) said power-receiving microprocessor drives said voltage sensor circuit to detect the voltage of said high-frequency filter capacitor of said filter circuit, and then proceeds to step (d09) when the detected voltage is below the predetermined limit, or step (d10) when the detected voltage is above the predetermined limit;
- (d09) said power-receiving microprocessor outputs an encode signal for power-up to said signal modulation circuit, driving said power-receiving coil array to emit a data signal to said power-supplying module for correcting power output, and then proceeds to step (d11);
- (d10) said power-receiving microprocessor outputs an encode signal for power-down to said signal modulation circuit, driving said power-receiving coil array to emit a data signal to said power-supplying module for correction of power output;
- (d11) said power-receiving microprocessor drives said voltage sensor circuit to detect the voltage of said high-frequency filter capacitor of said filter circuit again, and then proceeds to step (d15) when the detected voltage is within the predetermined limit, or step (d12) if the detected voltage is not within the predetermined limit;
- (d12) said power-receiving microprocessor determines whether or not the continuous voltage of said high-frequency filter capacitor of said filter circuit is excessively high, and then said power-receiving microprocessor repeats step (d08) when not excessively high, or proceeds to step (d13) when excessively high;
- (d13) the status is determined to be an error; said power-receiving microprocessor turns off said synchronizing rectifier and said first power switch and said second power switch of said filter circuit;
- (d14) said power-receiving microprocessor outputs an encode signal for power interruption to said signal modulation circuit, driving said power-receiving coil array to emit a data signal to said power-supplying module for interruption of power output, and then repeats step (d01);
- (d15) said power-receiving microprocessor turns on said first power switch;
- (d16) said power-receiving microprocessor drives said voltage sensor circuit to detect the voltage of said low-frequency filter capacitor of said filter circuit, and then proceeds to step (d17) when the detected voltage is below the range of the predetermined limit, or step (d18) when the detected voltage is above the range of the predetermined limit;
- (d17) said power-receiving microprocessor outputs an encode signal for power-up to said signal modulation circuit, driving said power-receiving coil array to emit a data signal to said power-supplying module for correction of power output, and then proceeds to step (d19);
- (d18) said power-receiving microprocessor outputs an encode signal for power-down to said signal modulation circuit, driving said power-receiving coil array to emit a data signal to said power-supplying module for correction of power output;
- (d19) said power-receiving microprocessor drives said voltage sensor circuit to detect the voltage of said low-frequency filter capacitor of said filter circuit again, and then proceeds to step (d20) when the detected voltage is not within the predetermined limit, or step (521) when the detected voltage is within the predetermined limit;
- (d20) said power-receiving microprocessor determines whether or not the continuous voltage of said low-frequency filter capacitor of said filter circuit is excessively high, and then said power-receiving microprocessor repeats step (d513) when not excessively high;
- (d21) said power-receiving microprocessor turns on said second power switch of said filter circuit;
- (d22) said second power switch of said filter circuit starts to provide DC power supply to said power output terminal of said power-receiving module for output;
- (d23) said power-receiving microprocessor drives said temperature sensor module of said power-receiving module to detect the operating temperature of power-receiving end filter circuit and power-receiving end power-receiving coil array, and then proceeds to step (d24) when the detected value surpasses the predetermined limit, or step (d25) when the detected value is within the predetermined limit;
- (d24) the detected temperature is excessively high, and said power-receiving microprocessor repeats step (d13); and
- (d25) the detected temperature is normal, and said power-receiving microprocessor is ready for a next voltage sensing cycle and then repeats step (d07).

6. The power transmission method as claimed in claim 1, wherein said power-supplying module further comprises indicator device electrically connected to said power-supplying microprocessor, said indicator device comprising a sound module adapted for providing a warning sound and a display unit adapted for displaying the operating status of said power-supplying module.

7. The power transmission method as claimed in claim 6, wherein said sound module is selected from a group consisting of speaker and buzzer.

8. The power transmission method as claimed in claim 1, wherein said display unit is selected from a group consisting of LED indicator light set, 7-segment display and LCD module.

* * * * *